United States Patent
Webb

(10) Patent No.: US 12,385,878 B2
(45) Date of Patent: Aug. 12, 2025

(54) METHOD FOR ION/ION REACTION FOR ION MOBILITY MASS SPECTROSCOPY

(71) Applicant: THE TRUSTEES OF INDIANA UNIVERSITY, Bloomington, IN (US)

(72) Inventor: Ian K. Webb, Whitestown, IN (US)

(73) Assignee: THE TRUSTEES OF INDIANA UNIVERSITY, Bloomington, IN (US)

(*) Notice: Subject to any disclaimer, the term of this patent is extended or adjusted under 35 U.S.C. 154(b) by 519 days.

(21) Appl. No.: 17/925,471

(22) PCT Filed: May 27, 2021

(86) PCT No.: PCT/US2021/034480
§ 371 (c)(1),
(2) Date: Nov. 15, 2022

(87) PCT Pub. No.: WO2021/247358
PCT Pub. Date: Dec. 9, 2021

(65) Prior Publication Data
US 2023/0184715 A1 Jun. 15, 2023

Related U.S. Application Data

(60) Provisional application No. 63/032,899, filed on Jun. 1, 2020.

(51) Int. Cl.
*H01J 49/42* (2006.01)
*G01N 27/623* (2021.01)

(52) U.S. Cl.
CPC ........ *G01N 27/623* (2021.01); *H01J 49/4225* (2013.01)

(58) Field of Classification Search
CPC .. H01J 49/0031; H01J 49/061; H01J 49/0036; H01J 49/0077; H01J 49/004; H01J 49/4225; H01J 49/4215; G01N 27/623
See application file for complete search history.

(56) References Cited

PUBLICATIONS

Fernandez-Maestre et al., "Ammonia as a modifier in ion mobility spectrometry: effects on ion mobilities and potential as a separation tool", 2014, J. Chil. Chem. Soc. 59 No 1, abstract; p. 2398, 2399, 2402 (Year: 2014).*
Kiss et al., "Size, weight, and position: ion mobility spectrometry and imaging MS combined", 2011, Anal Bioanal Chem., 399, p. 2623-2634 (Year: 2011).*
PCT International Search Report and Written Opinion completed by the ISA/US on Oct. 11, 2021 and issued in connection with PCT/US2021/034480.
Fernandez-Maestre et al. "Ammonia as a Modifier in Ion Mobility Spectrometry: Effects on Ion Mobilities and Potential as a Separation Tool", J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.

(Continued)

*Primary Examiner* — David E Smith
*Assistant Examiner* — Hsien C Tsai
(74) *Attorney, Agent, or Firm* — Barnes & Thornburg LLP

(57) ABSTRACT

A mass spectrometry method comprises generating ions and separating the ions in an ion mobility cell. Some of the generated ions can be contacted with a mobility modifier. The ions can be analyzed with a mass analyzer.

20 Claims, 18 Drawing Sheets

Figure 1A:
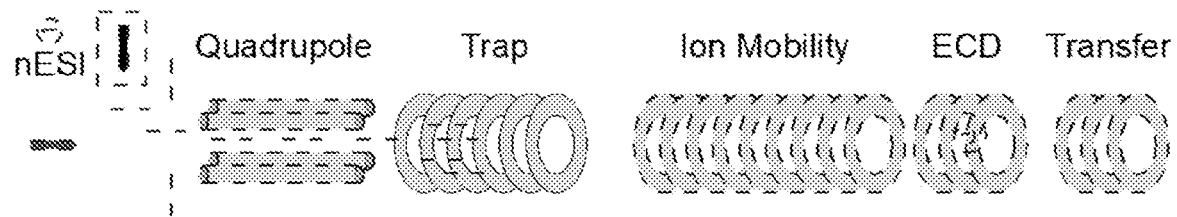

Specification includes a Sequence Listing.

(56) References Cited

PUBLICATIONS

Kiss et al. "Size, weight and position: ion mobility spectrometry and imaging MS combined", Anal Bioanal Chem. 2011. 399: pp. 2623-2634, especially: p. 2626, col. 1, para 1.
Kafle et al. "Understanding gas phase modifier interactions in rapid analysis by Differential Mobility-Tandem Mass Spectrometry", J Am Soc Mass Spectrom. 2014. 25(7): pp. 1098-1113, especially: p. 7, para 2; p. 10, para 5; p. 11, para 1.

* cited by examiner

G I G A V L K V L T T G L P A L I S W I K R K R Q Q

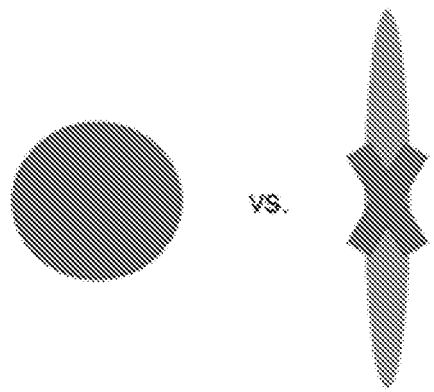
Fig. 3A
≤ 11.4 Å
150-3
20-30
88-94
136-128
Fig. 3B
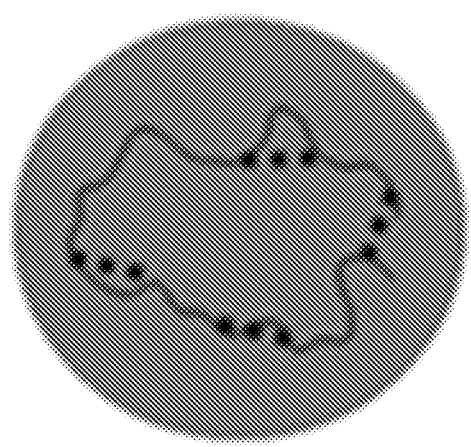
Fig. 3C

MQIFVKTLTGKTITLEVEPS
DTIENVKAKIQDKEGIPPDQ
QRLIFAGKQLEDGRTLSDYN
IQKESTLHLVLRLRGG

SEQUENCE LISTING

```
<160> NUMBER OF SEQ ID NOS: 7

<210> SEQ ID NO 1
<211> LENGTH: 26
<212> TYPE: PRT
<213> ORGANISM: Apis mellifera

<400> SEQUENCE: 1

Gly Ile Gly Ala Val Leu Lys Val Leu Thr Thr Gly Leu Pro Ala Leu
1               5                   10                  15

Ile Ser Trp Ile Lys Arg Lys Arg Gln Gln
            20                  25

<210> SEQ ID NO 2
<211> LENGTH: 76
<212> TYPE: PRT
<213> ORGANISM: Homo sapiens

<400> SEQUENCE: 2

Met Gln Ile Phe Val Lys Thr Leu Thr Gly Lys Thr Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Arg Leu Ile Phe Ala Gly Lys
        35                  40                  45

Gln Leu Glu Asp Gly Arg Thr Leu Ser Asp Tyr Asn Ile Gln Lys Glu
    50                  55                  60

Ser Thr Leu His Leu Val Leu Arg Leu Arg Gly Gly
65                  70                  75

<210> SEQ ID NO 3
<211> LENGTH: 11
```

```
<212> TYPE: PRT
<213> ORGANISM: Bos taurus

<400> SEQUENCE: 3

His Pro Glu Tyr Ala Val Ser Val Leu Leu Arg
1               5                   10

<210> SEQ ID NO 4
<211> LENGTH: 10
<212> TYPE: PRT
<213> ORGANISM: Bos taurus

<400> SEQUENCE: 4

Glu Cys Cys Asp Lys Pro Leu Leu Glu Lys
1               5                   10

<210> SEQ ID NO 5
<211> LENGTH: 11
<212> TYPE: PRT
<213> ORGANISM: Bos taurus

<400> SEQUENCE: 5

His Leu Val Asp Glu Pro Gln Asn Leu Ile Lys
1               5                   10

<210> SEQ ID NO 6
<211> LENGTH: 10
<212> TYPE: PRT
<213> ORGANISM: Homo sapiens

<400> SEQUENCE: 6

Asp Arg Val Tyr Ile His Pro Phe His Leu
1               5                   10

<210> SEQ ID NO 7
<211> LENGTH: 10
<212> TYPE: PRT
<213> ORGANISM: Bos taurus
<220> FEATURE:
<221> NAME/KEY: MISC_FEATURE
<222> LOCATION: (2)..(2)
<223> OTHER INFORMATION: Xaa at position 2 is a carbamidomethylcysteine
<220> FEATURE:
<221> NAME/KEY: MISC_FEATURE
<222> LOCATION: (3)..(3)
<223> OTHER INFORMATION: Xaa at position 3 is a carbamidomethylcysteine

<400> SEQUENCE: 7

Glu Xaa Xaa Asp Lys Pro Leu Leu Glu Lys
1               5                   10
```

METHOD FOR ION/ION REACTION FOR ION MOBILITY MASS SPECTROSCOPY

CROSS-REFERENCE TO RELATED APPLICATIONS

This application is a U.S. national counterpart application of international application serial No. PCT/US2021/034480 filed May 27, 2021, which claims the benefit of U.S. Provisional Patent Application No. 63/032,899, filed Jun. 1, 2020, the entire disclosures of which are incorporated by reference herein in their entireties.

GOVERNMENT RIGHTS

This invention was made with government support under GM134408 awarded by National Institutes of Health. The Government has certain rights in the invention.

BACKGROUND

Identifying and quantifying proteins, metabolites, and synthetic compounds in biological and environmental samples is key to understanding nature's biochemical processes and systems. Since the advent of electrospray ionization, liquid chromatography coupled to mass spectrometry (LC-MS) has been the method of choice for investigating complex systems. More recently, ion mobility (IM) has been added to the workflow between the chromatography and mass analysis steps. IM separates gas-phase ions by applying a voltage across a region filled with inert gas. The combination of the three methods allows for separations in three dimensions: retention by the LC stationary phase, molecular conformational space with ion mobility separations, and mass-to-charge ratio (m/z). IM-MS systems allow simultaneous acquisition of mobility and mass data due to rapid IM analysis times (tens of milliseconds). Information about biomolecular class is rapidly obtained due to the differences in gas-phase packing efficiency for different compound classes that appear as different m/z vs. mobility trends. IM can separate isomeric species, a difficult problem for current MS technology. However, the resolution of available IM-MS systems that can be coupled to LC-MS is low, limiting the separation power, sensitivity, and selectivity of IM-MS methods. Attempts at achieving higher resolution have focused on increasing the separation path length, and thus separation time, by orders of magnitude. These slow techniques are incompatible with online separations. This significantly decreases the dynamic range and depth of molecular coverage. Increasing the resolution of IM measurements while maintaining rapid analysis times is necessary for characterizing compounds present in complex mixtures. Often, isomers cannot be separated by tandem mass spectrometry or liquid chromatography techniques; increasing the ability of IM to detect and quantify isomers is a critical need.

SUMMARY

According to one aspect of the present disclosure, a mass spectrometry method comprises generating ions to form a mixture of ions comprising a first ion and a second ion, contacting the first ion and the second ion with a mobility modifier to form a modified first ion and a modified second ion, separating in an ion mobility cell the modified first ion and the modified second ion, and analyzing a mass spectrum of ions from the ion mobility cell.

According to another aspect of the present disclosure, a method for analyzing the structure of a protein comprises contacting a first peptide in a mixture of peptides with a mobility modifier to form a modified peptide, separating in an ion mobility cell the modified peptide from the mixture of peptides, and analyzing a mass spectrum of the modified peptide from the ion mobility cell.

According to another aspect of the present disclosure a mass spectrometry method comprises generating ions to form a mixture of ions comprising a first ion and a second ion, contacting the first ion and the second ion with a mobility modifier where the mobility modifier interacts with the first ion to form a modified ion and the mobility modifier does not form a modified ion with the second ion, separating in an ion mobility cell the modified first ion and the second ion, and analyzing a mass spectrum of ions from the ion mobility cell.

Additional features of the present disclosure will become apparent to those skilled in the art upon consideration of illustrative embodiments exemplifying the best mode of carrying out the disclosure as presently perceived.

1. A mass spectrometry method comprising
    generating ions to form a mixture of ions comprising a first ion and a second ion,
    contacting the first ion and the second ion with a mobility modifier to form a modified first ion and a modified second ion,
    separating in an ion mobility cell the modified first ion from the modified second ion, and
    analyzing a mass spectrum of ions from the ion mobility cell.
2. The method of clause 1, wherein the step of contacting occurs in the gas phase.
3. The method of clause 1 or 2, wherein the mixture of ions comprises peptides, lipids, carbohydrates, small molecules, or a combination thereof.
4. The method of any one of the preceding clauses, wherein the mixture of ions comprises peptides.
5. The method of any one of the preceding clauses, wherein the mixture of ions comprises cations.
6. The method of any one of the preceding clauses, wherein the mixture of ions comprises anions.
7. The method of any one of the preceding clauses, wherein the step of generating is performed by an electrospray source.
8. The method of any one of the preceding clauses, wherein the step of contacting is performed in a trap cell.
9. The method of any one of the preceding clauses, wherein the step of analyzing is performed by a time-of-flight mass analyzer.
10. The method of any one of the preceding clauses, wherein the mobility modifier comprises at least one, at least two, or at least three ionizable groups.
11. The method of any one of the preceding clauses, wherein the mobility modifier comprises a cross-linking group.
12. The method of clause 11, wherein the cross-linking group is an aldehyde, an anhydride, a thiol, a maleimide, an activated ester, a ketenimide, an isoxazolium, an acyl halogen, an azide, a carbene, or a hydrazide.
13. The method of clause 12, wherein the cross-linking group comprises N-hydroxy succinimide.
14. The method of any one of the preceding clauses, wherein the mobility modifier is ionic.
15. The method of any one of the preceding clauses, wherein the mobility modifier is cationic.

16. The method of any one of the preceding clauses, wherein the mobility modifier comprises a quaternary ammonium salt, an amine, a guanidinium, or a metal ion.
17. The method of any one of clauses 1-14, wherein the mobility modifier is anionic.
18. The method of any one of clauses 1-14 or 17, wherein the mobility modifier comprises a sulfonate, a phosphonate, a carboxylate, or a combination thereof.
19. The method of any one of clauses 1-14, 17, or 18, wherein the mobility modifier comprises a sulfobenzoic acid.
20. The method of clause 19, wherein the sulfobenzoic acid is coupled to an amine-containing ion by EDT and NHS coupling.
21. The method of any one of clauses 1-14, 17, or 18, wherein the mobility modifier comprises an aryl sulfonate.
22. The method of clause 21, wherein the aryl sulfonate is

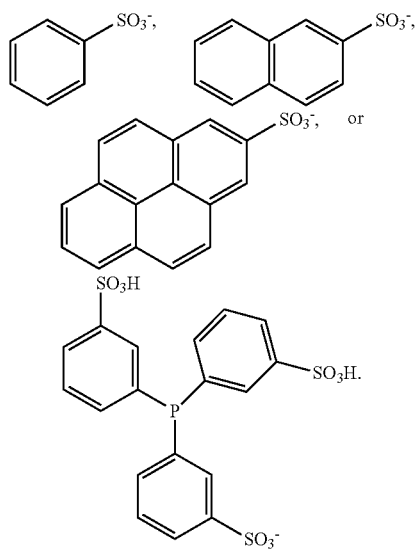

23. The method of any one of clauses 1-20, wherein the mobility modifier comprises an organic dye.
24. The method of any one of clauses 1-10, wherein is the mobility modifier comprises 4-formylbenzene-1,3-disulfonic acid disodium salt hydrate (FBDSA), 1-Hydroxy-7-azabenzotriazole (HOAT), 1-Ethyl-3-(3-dimethylaminopropyl) carbodiimide hydrochloride (EDC), or 2,2,3,3,4,4,5,5,6,6,7,7,8,8,8-pentadecafluoro-1-octanol (PFO).
25. The method of any one of the preceding clauses, wherein the step of contacting forms ionic complexes.
26. The method of any one of the preceding clauses, wherein the mobility modifier forms a covalent bond with an ion in the mixture of ions.
27. The method of any one of the preceding clauses, the method of any one of the preceding claims, wherein the mixture of ions comprises peptides complexed with the mobility modifier and peptides not complexed with the mobility modifier.
28. The method of any one of the preceding clauses, wherein the mixture of ions is formed from a protein.
29. A method for analyzing the structure of a protein, the method comprising (a1) contacting a first peptide in a mixture of peptides with a mobility modifier to form a modified peptide, or
(a2) contacting a protein with a mobility modifier to form a modified protein,
(b) separating in an ion mobility cell the modified peptide or the modified protein, and
(c) analyzing a mass spectrum of modified peptide or modified protein from the ion mobility cell.

30. The method of clause 29, wherein the step of contacting occurs in the gas phase.
31. The method of clause 29 or 30, wherein the mixture of peptides comprises further comprises lipids, carbohydrates, small molecules, or a combination thereof.
32. The method of any one of clauses 29-31, wherein the mixture of peptides comprises digested peptides.
33. The method of any one of clauses 29-32, wherein the mixture of peptides comprises cations.
34. The method of any one of clauses 29-33, wherein the mixture of peptides comprises anions.
35. The method of any of clauses 29-34, wherein the step of generating is performed by an electrospray source.
36. The method of any one of clauses 29-35, wherein the step of contacting is performed in a trap cell.
37. The method of any one of clauses 29-36, wherein the step of analyzing is performed by a time-of-flight mass analyzer.
38. The method of any one of clauses 29-37, wherein the mobility modifier comprises at least one, at least two, or at least three ionizable groups.
39. The method of any one of clauses 29-38, wherein the mobility modifier comprises a cross-linking group.
40. The method of clause 39, wherein the cross-linking group is an aldehyde, an anhydride, a thiol, a maleimide, an activated ester, a ketenimide, an isoxazolium, an acyl halogen, an azide, a carbene, or a hydrazide.
41. The method of clause 40, wherein the cross-linking group comprises N-hydroxy succinimide.
42. The method of any one of clauses 29-41, wherein the mobility modifier is ionic.
43. The method of any one of clauses 29-42, wherein the mobility modifier is cationic.
44. The method of any one of clauses 29-43, wherein the mobility modifier comprises a quaternary ammonium salt, an amine, a guanidinium, or a metal ion.
45. The method of any one of clauses 29-42, wherein the mobility modifier is anionic.
46. The method of any one of clauses 29-42 or 45, wherein the mobility modifier comprises a sulfonate, a phosphonate, a carboxylate, or a combination thereof.
47. The method of any one of clauses 29-42, 45, or 46, wherein the mobility modifier comprises a sulfobenzoic acid.
48. The method of clause 47, wherein the sulfobenzoic acid is coupled to an amine-containing ion by EDT and NHS coupling.
49. The method of any one of clauses 29-42, 45, or 46, wherein the mobility modifier comprises an aryl sulfonate.
50. The method of clause 49, wherein the aryl sulfonate is

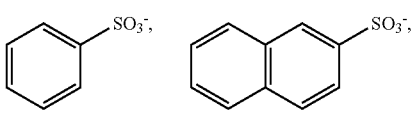

-continued

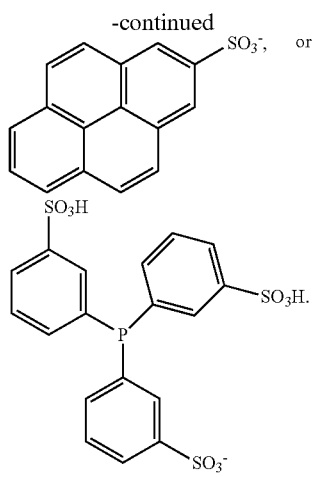

51. The method of any one of clauses 29-48, wherein the mobility modifier comprises an organic dye.
52. The method of any one of clauses 29-38, wherein is the mobility modifier comprises 4-formylbenzene-1,3-disulfonic acid disodium salt hydrate (FBDSA), 1-Hydroxy-7-azabenzotriazole (HOAT), 1-Ethyl-3-(3-dimethylaminopropyl) carbodiimide hydrochloride (EDC), or 2,2,3,3,4,4,5,5,6,6,7,7,8,8,8-pentadecafluoro-1-octanol (PFO).
53. The method of any one of clauses 29-38, wherein the step of contacting forms ionic complexes.
54. The method of any one of clauses 29-53, wherein the mobility modifier forms a covalent bond with the first peptide.
55. The method of any one of clauses 29-54, wherein the mixture of ions comprises peptides.
56. A mass spectrometry method comprising
   generating ions to form a mixture of ions comprising a first ion and a second ion,
   contacting the first ion and the second ion with a mobility where the mobility modifier interacts with the first ion to form a modified ion and the mobility modifier does not form modified ion with the second ion,
   separating in an ion mobility cell the modified first ion and the second ion, and
   analyzing a mass spectrum of ions from the ion mobility cell.
57. The method of clause 56, wherein the step of contacting occurs in the gas phase.
58. The method of clause 56 or 57, wherein the mixture of ions comprises peptides, lipids, carbohydrates, small molecules, or a combination thereof.
59. The method of any one of clauses 56-58, wherein the mixture of ions comprises peptides.
60. The method of any one of clauses 56-59, wherein the mixture of ions comprises cations.
61. The method of any one of clauses 56-60, wherein the mixture of ions comprises anions.
62. The method of any one of clauses 56-61, wherein the step of generating is performed by an electrospray source.
63. The method of any one of clauses 56-63, wherein the step of contacting is performed in a trap cell.
64. The method of any one of clauses 56-63, wherein the step of analyzing is performed by a time-of-flight mass analyzer.
65. The method of any one of clauses 56-64, wherein the mobility modifier comprises at least one, at least two, or at least three ionizable groups.
66. The method of any one of clauses 56-65, wherein the mobility modifier comprises a cross-linking group.
67. The method of clause 66, wherein the cross-linking group is an aldehyde, an anhydride, a thiol, a maleimide, an activated ester, a ketenimide, an isoxazolium, an acyl halogen, an azide, a carbene, or a hydrazide.
68. The method of clause 67, wherein the cross-linking group comprises N-hydroxy succinimide.
69. The method of any one of clauses 56-68, wherein the mobility modifier is ionic.
70. The method of any one of clauses 56-69, wherein the mobility modifier is cationic.
71. The method of any one of clauses 56-70, wherein the mobility modifier comprises a quaternary ammonium salt, an amine, a guanidinium, or a metal ion.
72. The method of any one of clauses 56-69, wherein the mobility modifier is anionic.
73. The method of any one of clauses 56-69 or 72, wherein the mobility modifier comprises a sulfonate, a phosphonate, a carboxylate, or a combination thereof.
74. The method of any one of clauses 56-69, 72 or 73, wherein the mobility modifier comprises a sulfobenzoic acid.
75. The method of clause 74, wherein the sulfobenzoic acid is coupled to an amine-containing ion by EDT and NHS coupling.
76. The method of any one of clauses 56-69, 72, or 73, wherein the mobility modifier comprises an aryl sulfonate.
77. The method of clause 76, wherein the aryl sulfonate is

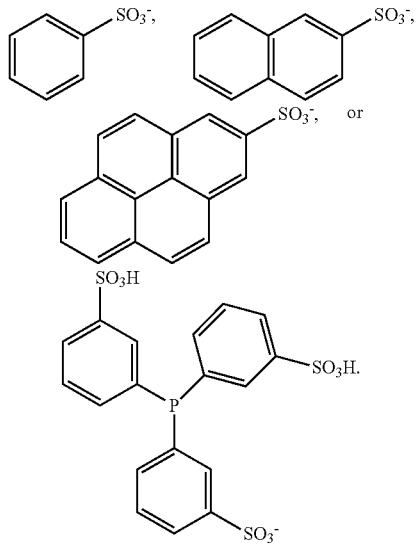

78. The method of any one of clauses 56-77, wherein the mobility modifier comprises an organic dye.
79. The method of any one of clauses 56-65, wherein is the mobility modifier comprises 4-formylbenzene-1,3-disulfonic acid disodium salt hydrate (FBDSA), 1-Hydroxy-7-azabenzotriazole (HOAT), 1-Ethyl-3-(3-dimethylaminopropyl) carbodiimide hydrochloride (EDC), or 2,2,3,3,4,4,5,5,6,6,7,7,8,8,8-pentadecafluoro-1-octanol (PFO).

80. The method of any of the preceding clauses, wherein the step of contacting forms ionic complexes.

81. The method of any one of clauses 56-80, wherein the mobility modifier forms a covalent bond with an ion in the mixture of ions.

82. The method of any one of clauses 56-81, wherein the mixture of ions comprises peptides.

83. The method of any one of clauses 56-82, wherein the mixture of ions is formed from a protein.

BRIEF DESCRIPTIONS OF THE DRAWINGS

Figure 1B:
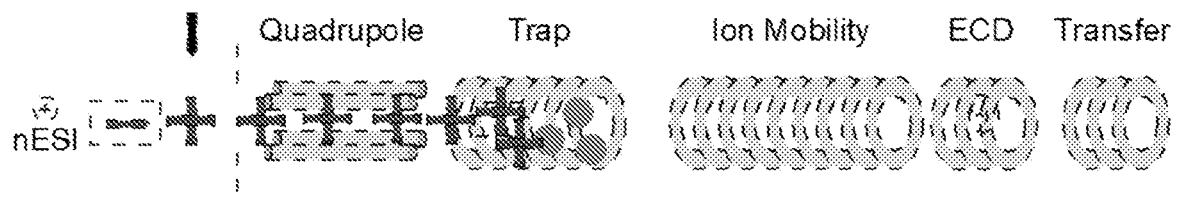
Figure 1C:
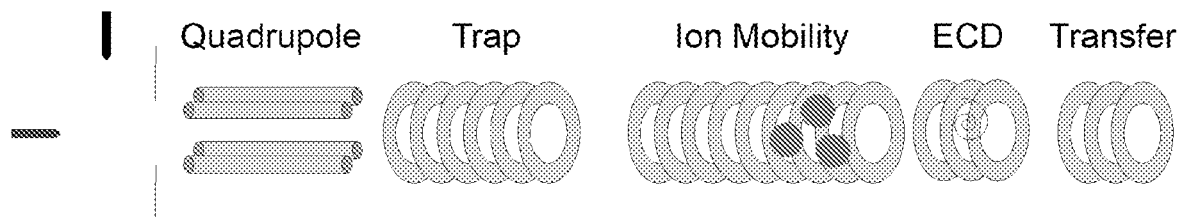
Figures 1D, 2:
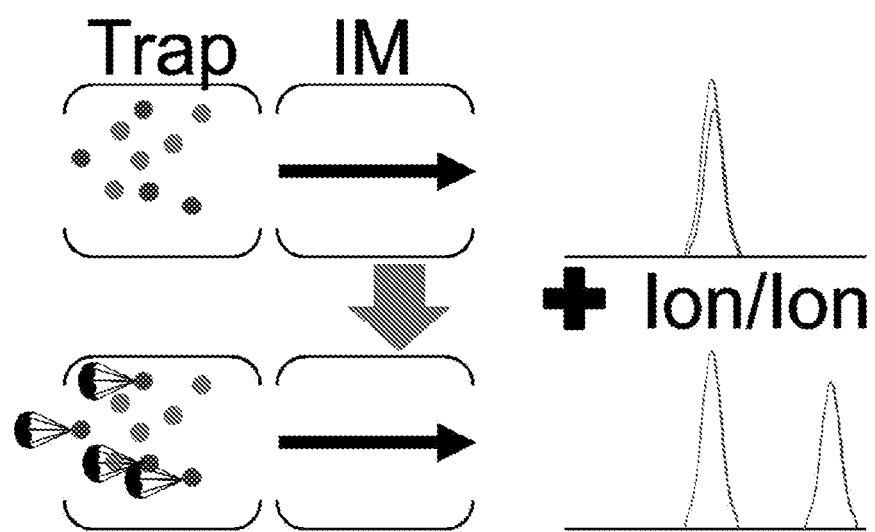

FIG. 1A shows reagents (minus signs) are mass selected in the quadrupole and injected into the trap. FIG. 1B shows protein cations (plus signs) are isolated and injected into the trap. Ion populations overlap and the ion/ion reactions proceed to products (circles). FIG. 1C shows product ions traverse the ion mobility cell and will draft through the ECD cell, the transfer cell, and into a time-of-flight mass analyzer (not shown). FIG. 1D shows an illustration of reaction chemistry that specifically targets a functional group that is present on black ions but not on gray ones. Initially, mobilities of the two compounds overlap. Addition of reagent increases drift time for the black ions, greatly enhancing separation.

FIG. 2 shows the expected results of gas-phase cross-linking of melittin (SEQ ID NO: 1) cations. The brackets above the sequence indicate cross-links between primary amines.

FIGS. 3A-C shows expected results of ion/ion CXMS with IM/MS for an illustrative protein. FIG. 3A shows the native CCS measurement reveals the protein is globular and not linear. FIG. 3B shows a list of illustrative cross-linked lysines identified by tandem MS. FIG. 3C shows a combination of data from the combined approach, where the protein's overall size and shape is bounded by the CCS measurement, and the folding is described by cross-linking identifications.

Figure 4:
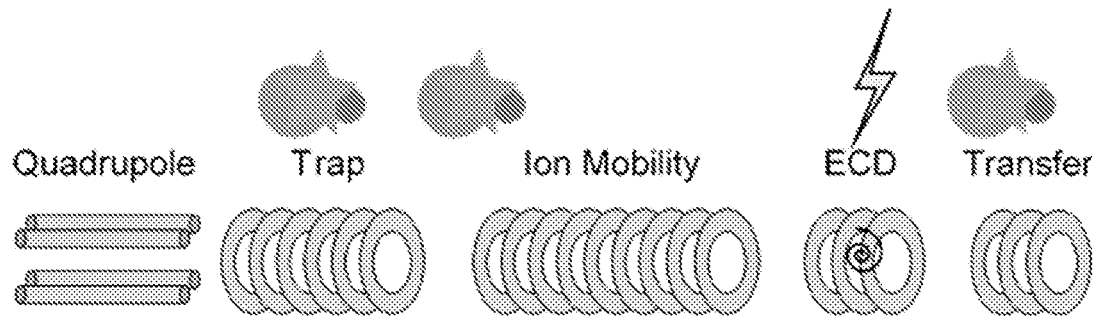

FIG. 4 shows the locations of ion fragmentation. CID is represented by illustration of two particles colliding and ECD is illustrated by the lightning bolt.

Figure 5A:
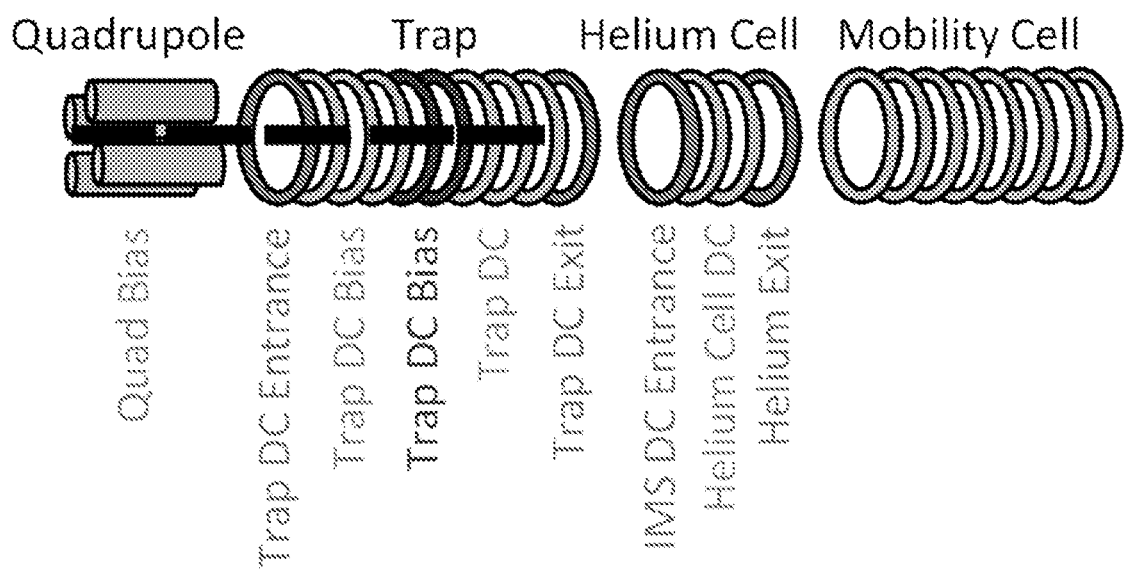
Figure 5B:
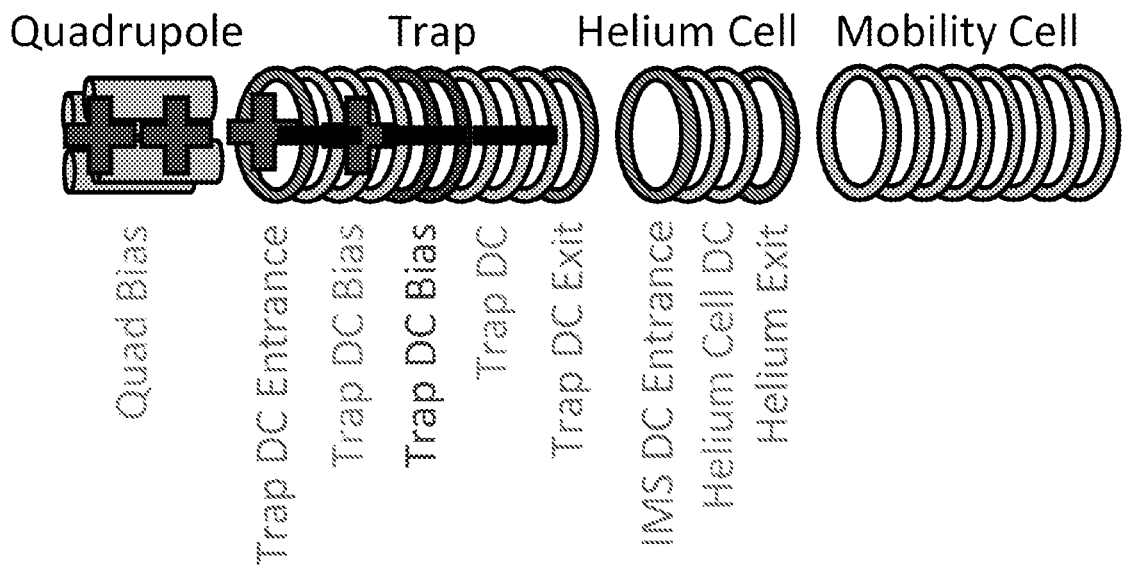
Figure 5C:
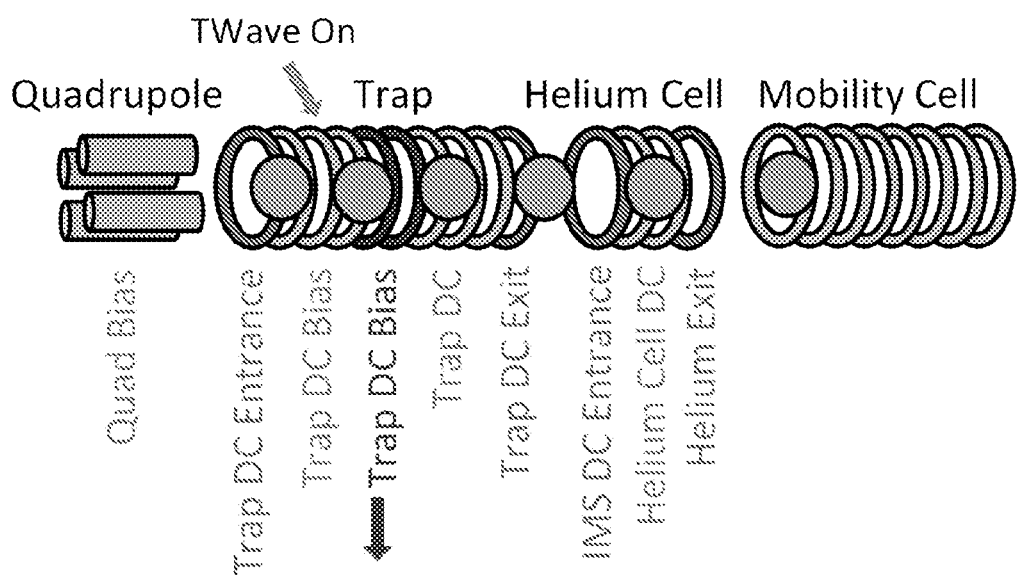
Figure 5D:
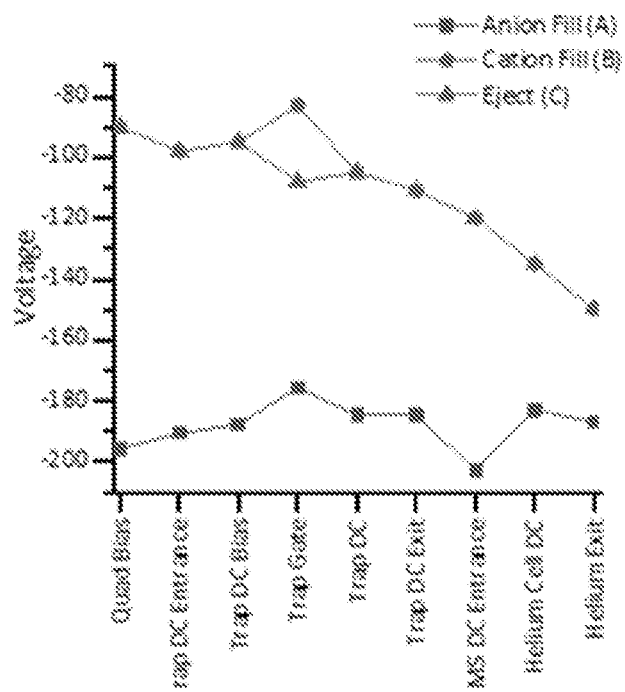

FIGS. 5A-D shows a cartoon of the region of the instrument involved with the ion/ion reactions. The labels below the ion optics correspond to the DC voltages that are applied during the experiment. FIG. 5A shows anions (minus signs) are mass selected in the quadrupole and injected into the trap. FIG. 5B shows cations (plus signs) are isolated and injected to the trap. The trap gate prevents cations from being released. Ion populations overlap and the ion/ion reaction proceeds to products (circles). FIG. 5C shows product ions are pulsed out of the trap with a 500 ms pulse of the trap gate and drift through the ion mobility cell. Products will traverse the transfer cell and into the time-of-flight mass analyzer (not shown). FIG. 5D shows a voltage diagram for the three states of the trap during the ion/ion reaction.

Figure 6A:
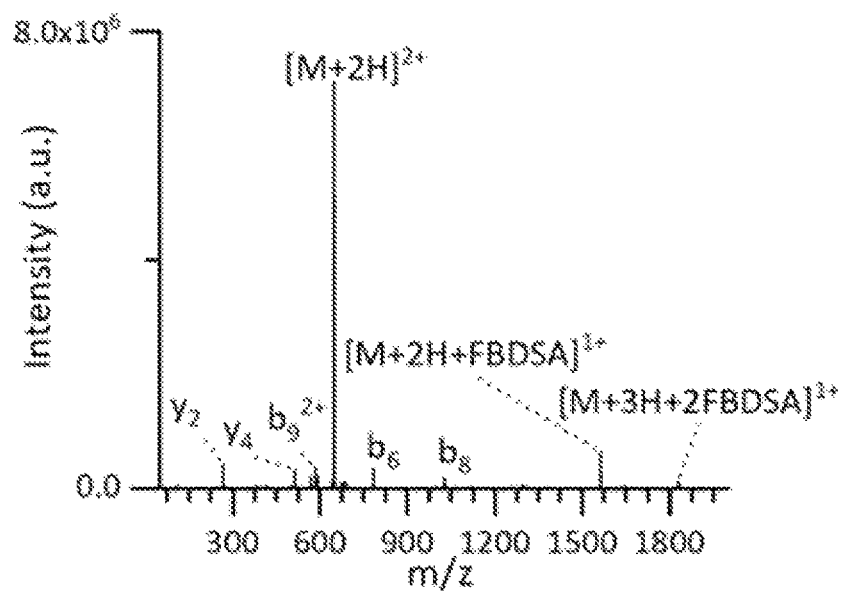
Figure 6B:
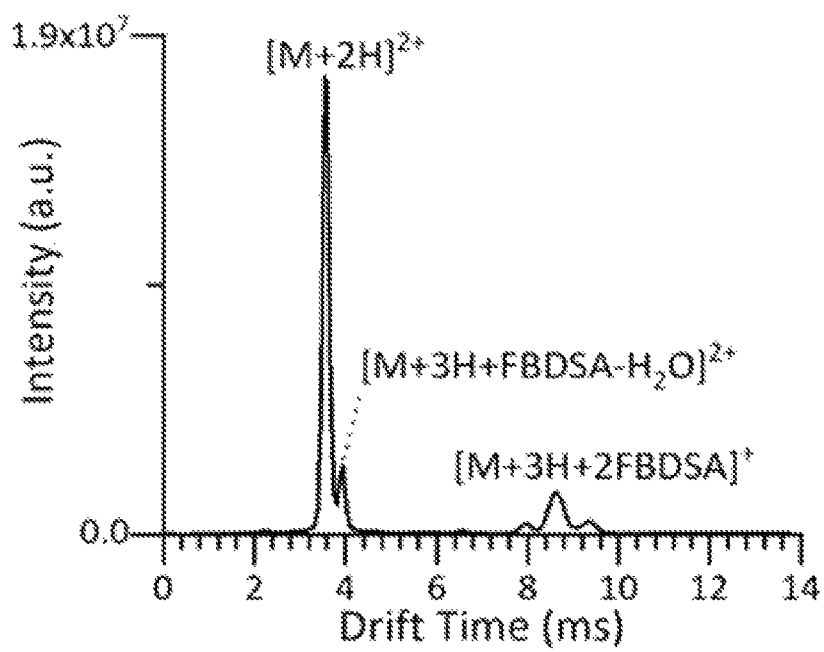
Figure 6C:
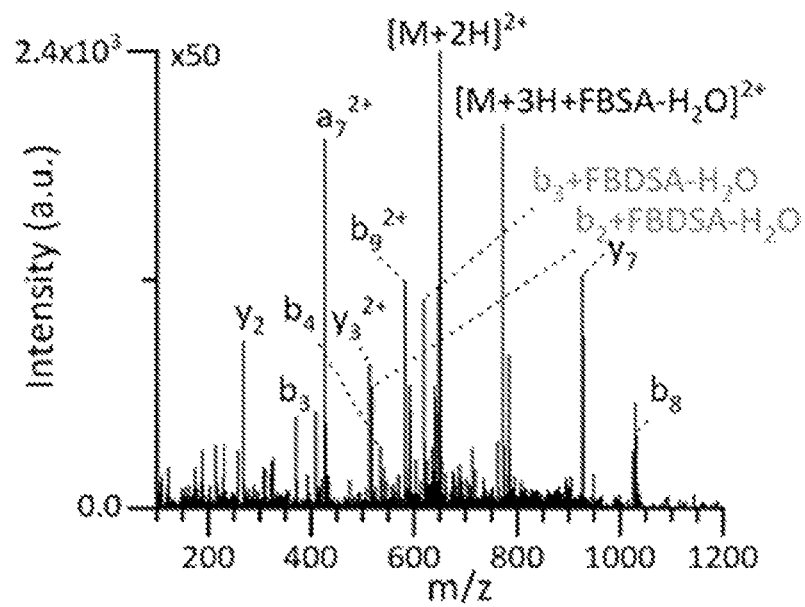
Figure 6D:
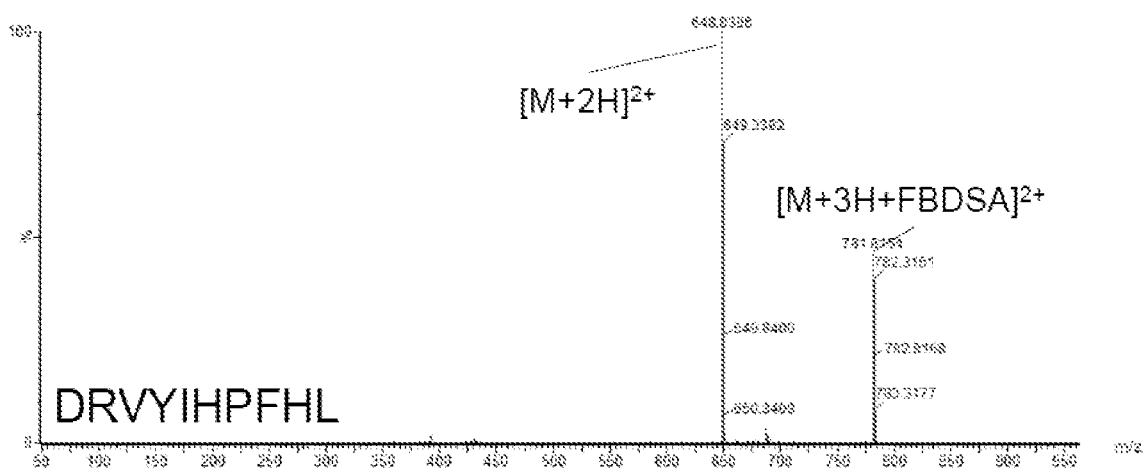
Figure 6E:
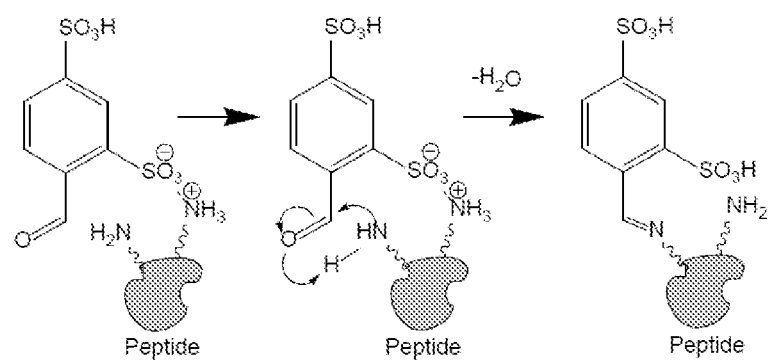

FIGS. 6A-E show ion/ion reaction of angiotensin I $3^+$ with FBDSA$^-$. FIG. 6A shows fragment mass spectrum resulting from CID of the ion/ion reaction products. FIG. 6B shows ATD corresponding to FIG. 6A. FIG. 6C shows a mass spectrum corresponding to 3.809 to 4.086 ms in the ATD. Covalently modified fragment ions are annotated in gray text. The mass spectrum from the ion/ion reaction prior to CID is shown in FIG. 6D. FIG. 6E is an illustration of an ion/ion reaction of FBDSA with a peptide.

Figure 7A:
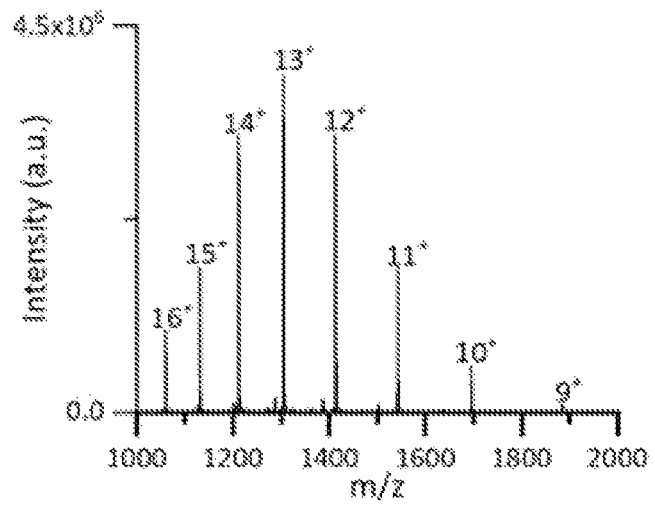
Figure 7B:
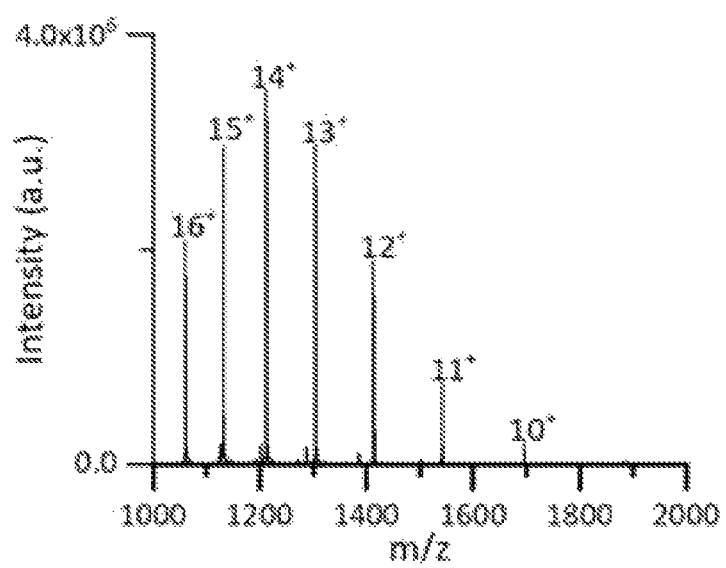
Figure 7C:
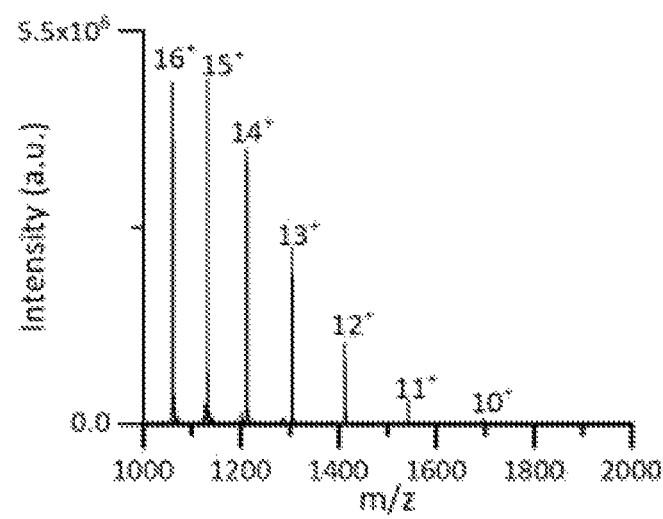

FIGS. 7A-D show the effects of the trap traveling wave voltage on the extent of reaction between apomyoglobin $16^+$ and PFO$^-$ dimer. Mass spectra are for traveling wave heights of FIG. 7A 0.1 V; FIG. 7B 0.15 V; FIG. 7C 0.2 V; and FIG. 7D 0.3 V.

Figure 8A:
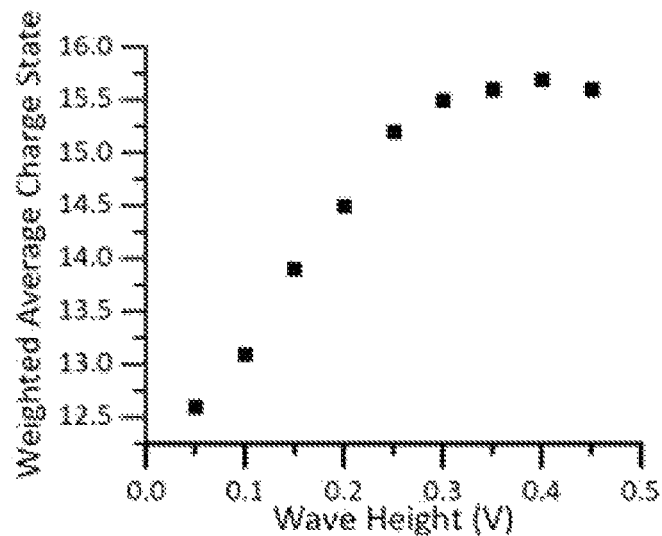
Figure 8B:
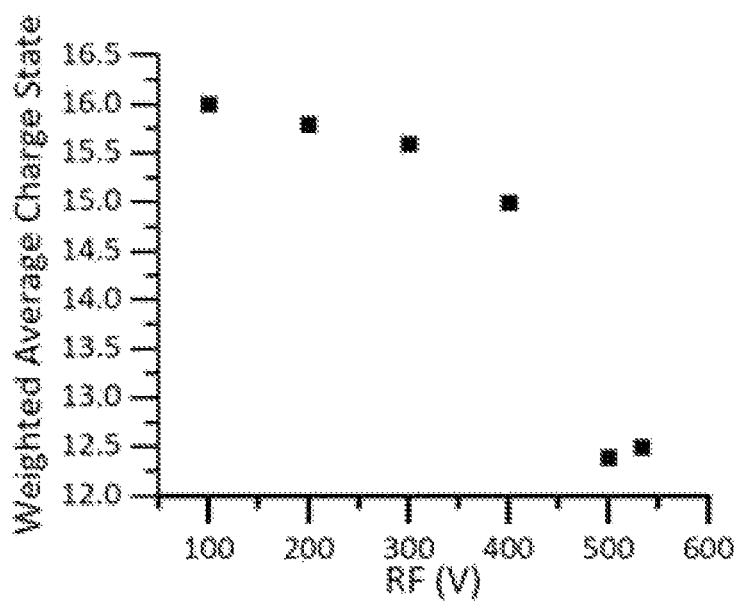
Figure 8C:
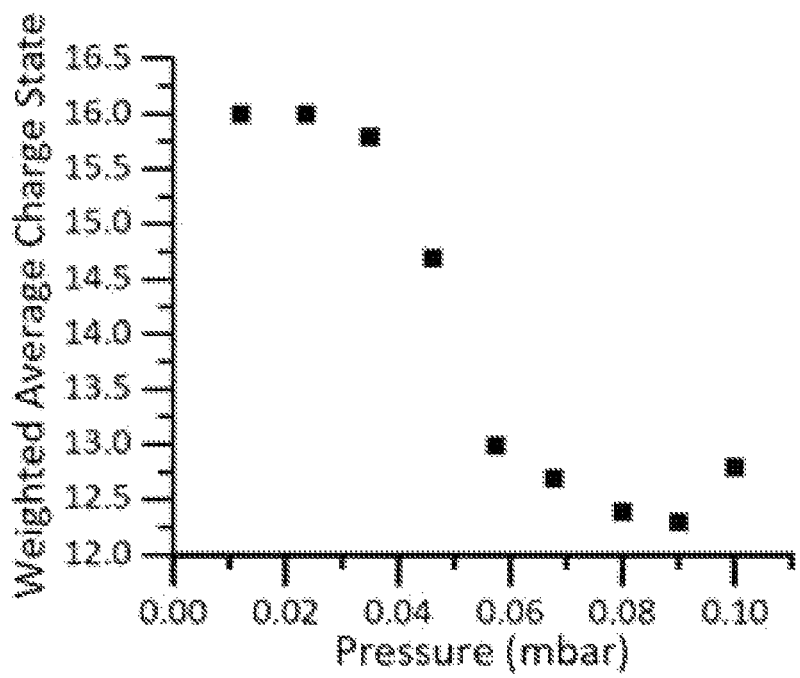

FIG. 8A shows the effects of the trap traveling wave voltage. FIG. 8B shows the effects of the trap RF. FIG. 8C shows the effects of trap pressure on the extent of reaction between apomyoglobin $16^+$ and PFO$^-$ dimer. The extent of the reaction is demonstrated by the weighted average charge state of the charge state distribution.

Figure 9A:
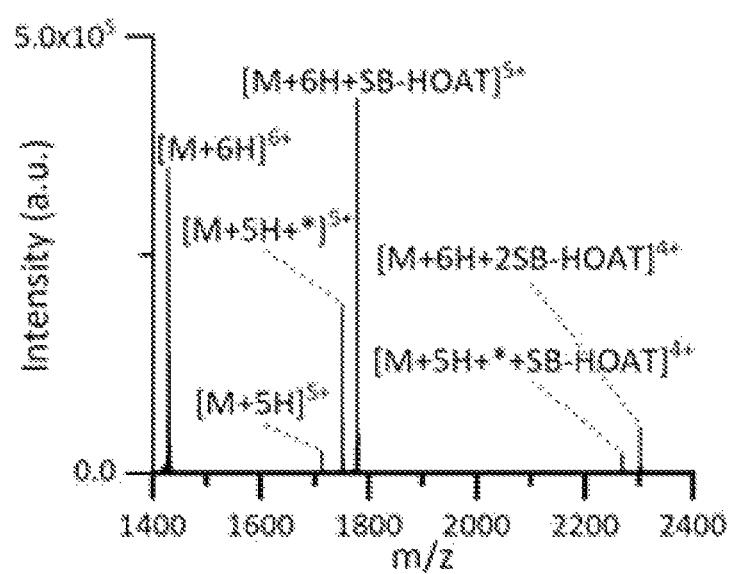
Figure 9B:
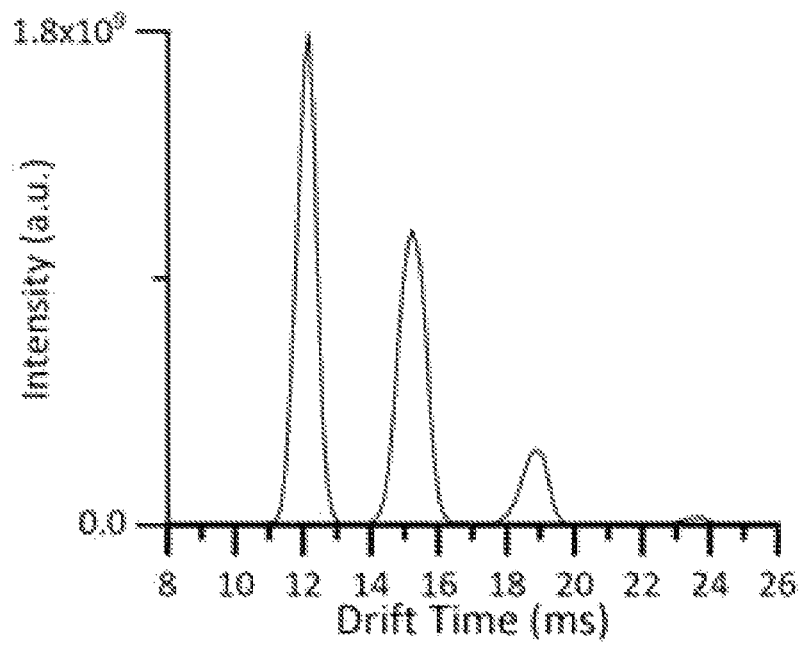
Figure 9C:
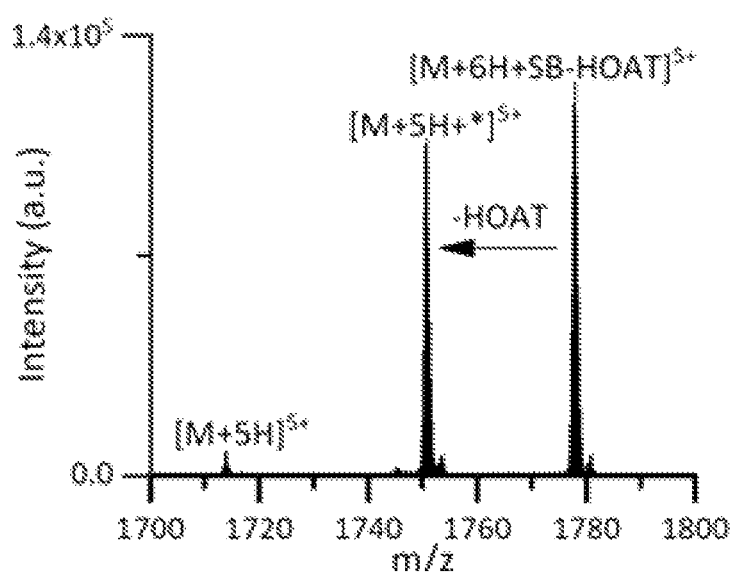
Figure 9D:
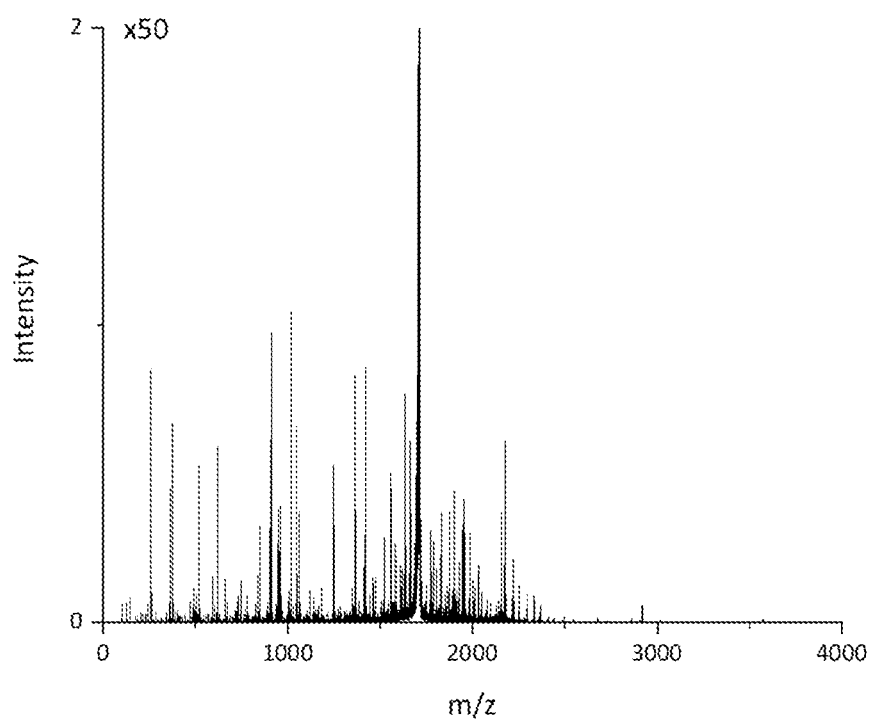
Figure 9E:
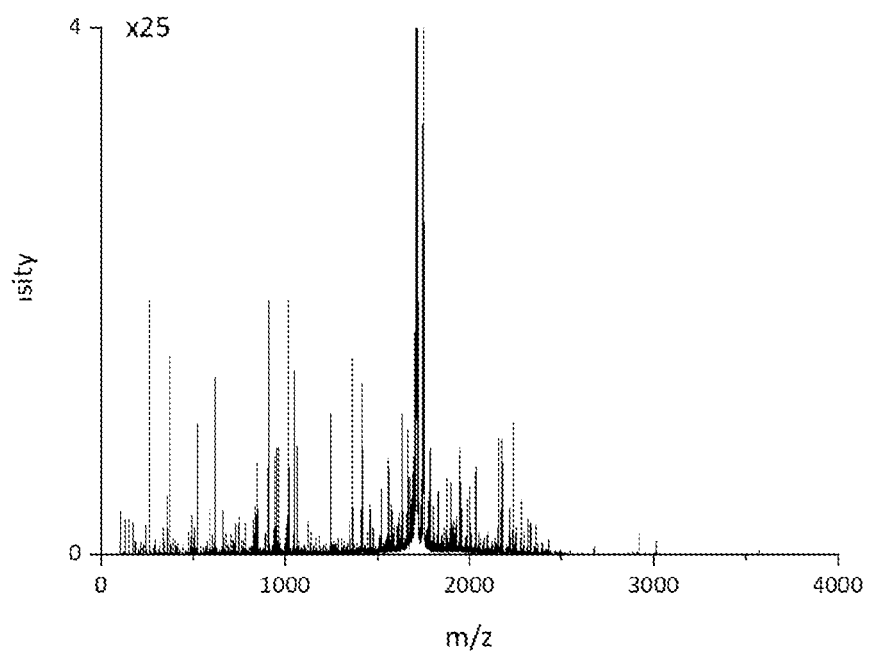

FIG. 9A shows a mass spectrum from the ion/ion reaction of ubiquitin $6^+$ with sulfo-benzoyl HOAT$^-$ (SB-HOAT). FIG. 9B shows ATD of ion/ion reaction in FIG. 9A with reduced pressures in the helium cell and IM cell and 40V trap cell bias. FIG. 9C shows a mass spectrum corresponding to 14.517-15.899 ms in FIG. 9B. The * denotes covalent addition of the sulfo-benzoyl moiety through observation of the neutral loss of HOAT. FIG. 9D shows the CID spectra of the unmodified precursor $[M+5H]^{5+}$. FIG. 9E shows the CID spectra of the modified precursor $[M+6H+*]^5$.

Figures 10, 11A:
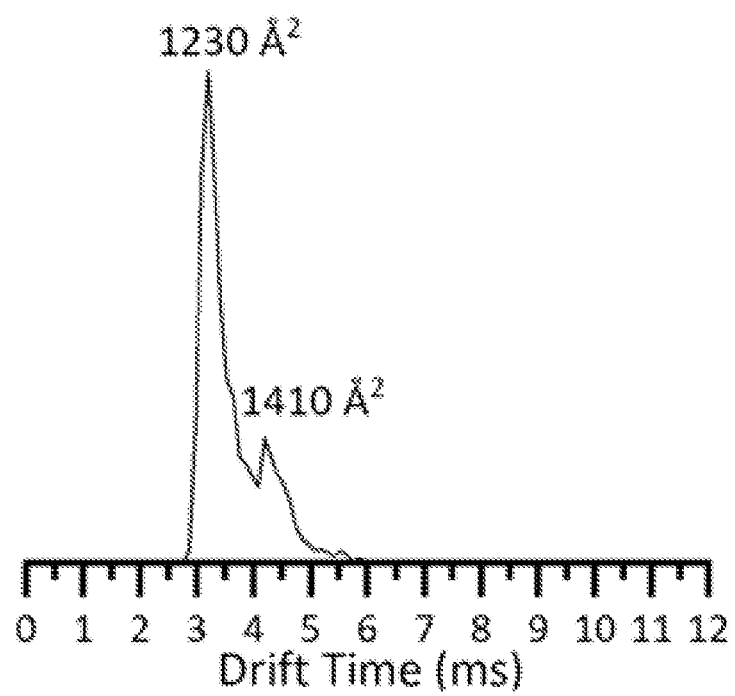

FIG. 10 shows a sequence ladder (SEQ ID NO: 2) of covalently modified ubiquitin $6^+$. Gray flags indicate fragments that contain the covalent modification. Black flags indicate the largest fragments that have no covalently modified counterpart. The two residues in gray, lysine 29 and arginine 54, are the two sites of covalent modification.

Figure 11B:
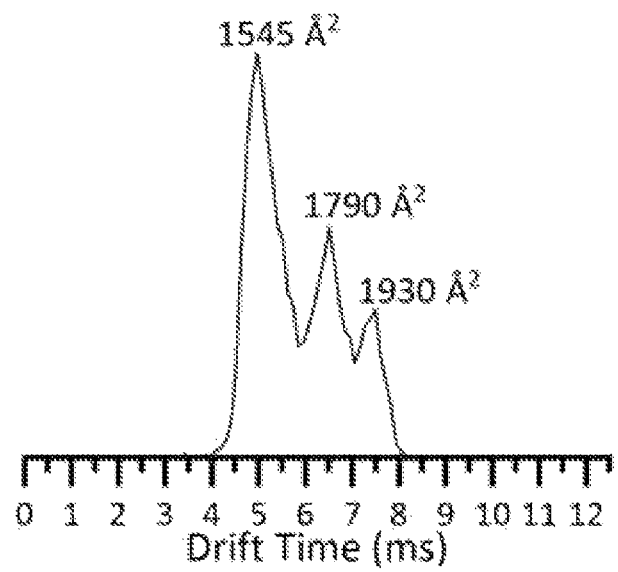
Figure 11C:
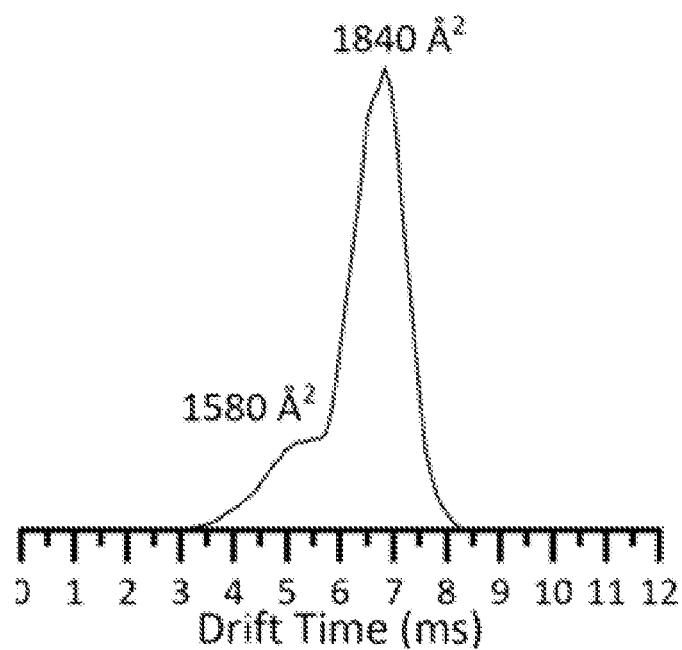

FIGS. 11A-C show ATD of ubiquitin $6^+$ from native conditions with various injection energies. FIG. 11A 30 V; FIG. 11B 40 V; and FIG. 11C 50 V.

Figure 12A:
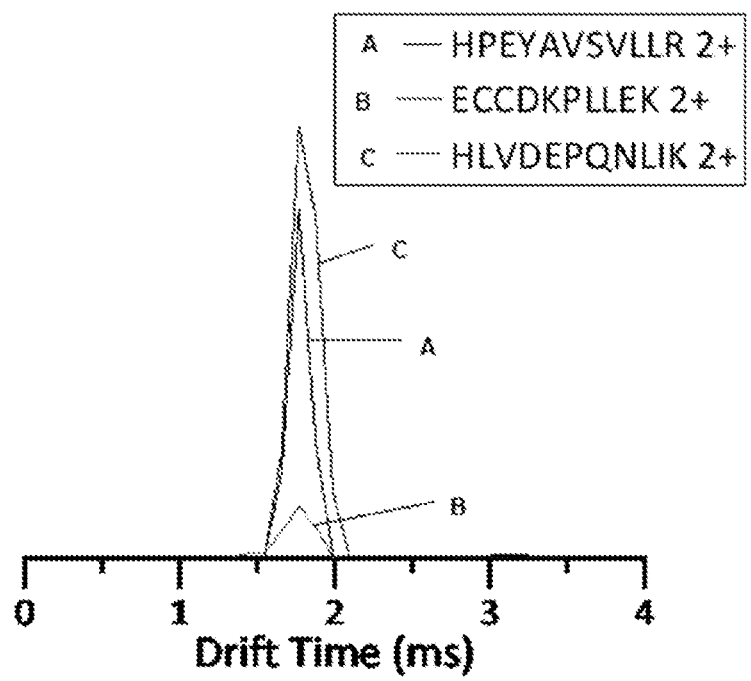
Figure 12B:
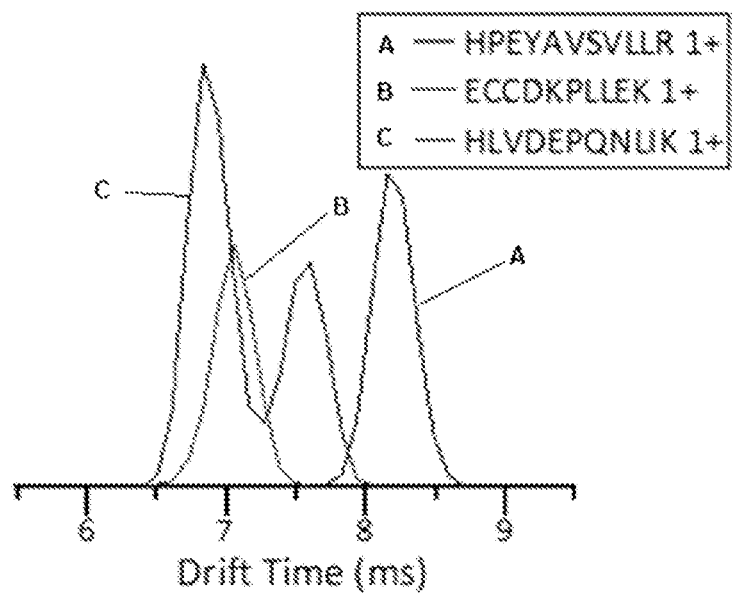
Figure 12C:
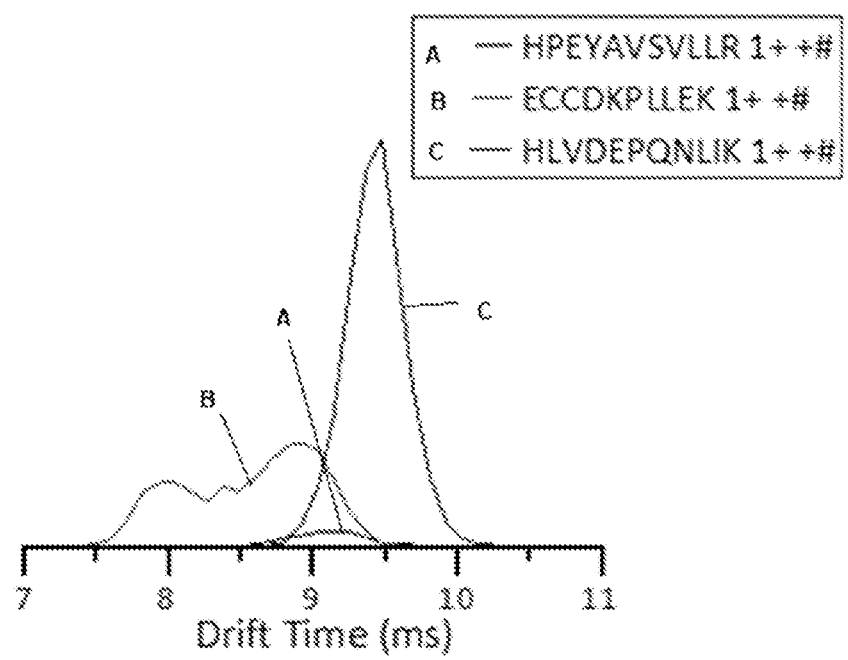

FIGS. 12A-C shows the extracted ion drift time spectra of tryptic peptides (HPEYAVSVLLR (SEQ ID NO: 3); ECCDKPLLEK (SEQ ID NO: 4); HLVDEPQNLIK (SEQ ID NO:5); from bovine serum albumin peptides. FIG. 12A shows a pre Ion/Ion IM spectrum. FIG. 12B shows a Proton Transfer IM Spectrum. FIG. 12C shows Electrostatic Complex (#) Formation IM Spectrum.

DETAILED DESCRIPTION

In illustrative embodiments, the present disclosure provides a mass spectrometry method for analyzing ions. In some embodiments, the method is used to analyze small molecules, proteins, peptides, carbohydrates, or lipids, although any suitable ion or ions may be analyzed. In illustrative embodiments, the method generates ions that are contacted by a mobility modifier to form a mobility-modified ion, as suggested in FIGS. 1A-D. In some embodiments, a first ion and a second ion are contacted by a mobility modifier. In some embodiments, only the first ion forms a complex and the second ion does not form a complex. The mobility-modified ions can be subsequently resolved using in an ion mobility cell, as shown in FIG. 1D. In some embodiments, the method comprises additional techniques known to mass spectrometry to provide further insights to the modified ions.

In illustrative embodiments, mobility modifiers selectively react with compounds containing either different chemical functional groups or different numbers and locations of these chemical groups. Illustratively, this may allow for increased resolution using ion-mobility trap separation. In some embodiments, unresolvable species may be separable after being contacted by the mobility modifier. In some embodiments, the mobility modifier may decrease the mobility of an ion by up to a factor of two. In some embodiments, contacting compounds or ions with a mobility modifier may enhance the separation factor by an order of magnitude.

In illustrative embodiments, the present disclosure is directed to a method for separating ions in a mass spectrometer. In some illustrative embodiments, the present disclosure is directed to performing chemistry, for example, ionic or covalent bond formation, in a mass spectrometer. Illustratively, the chemistry is performed in the gas phase or in droplets inside the mass spectrometer. In some embodiments, ions are generated using an ionization source and the ions are subsequently reacted in the mass spectrometer. In some embodiments, the ionization source generates cations that are mass selected with a quadruple to proceed to a trap. Subsequently, anions are generated and mass selected with the quadruple to proceed to the trap where the anions interact with the cations already present in the trap. In some embodiments, the ionization source generates anions that are mass selected with a quadruple to proceed to a trap. Subsequently, cations are generated and mass selected with the quadruple to proceed to the trap where the cations interact with the anions already present in the trap. Contacting the anion with the cation and vice versa alters the overall charge.

In illustrative embodiments, the method described herein is performed in a mass spectrometer, as shown in FIGS. 1A-D, 4, and 5A-C. In illustrative embodiments, the mass spectrometer comprises an electrospray source, a quadruple, a trap, a helium cell, an ion mobility cell, an ECD cell, a transfer cell, a mass analyzer, or a combination thereof. In some embodiments, the mass spectrometer comprises an electrospray source, a quadruple, a trap, an ion mobility cell, an ECD cell, a transfer cell, and a mass analyzer. In some embodiments, the mass spectrometer comprises electrospray source, a quadruple, a trap, an ion mobility cell, an ECD cell, a transfer cell, and a mass analyzer. In some embodiments, the mass spectrometer comprises an electrospray source, a quadruple, a trap, an ion mobility cell, an ECD cell, a transfer cell, and a mass analyzer. In some embodiments, the mass analyzer is a time-of-flight mass analyzer. In some embodiments, the potential differences between the two sections of the trap, the helium cell, the IM cell, and the transfer cell are tuned to maximize transmission of ion/ion reaction products or increased to effect collision induced dissociation (CID). Additional details regarding the mass spectrometer can be found in U.S. Pat. No. 8,927,295, the entire disclosure of which is incorporated herein by reference.

The electrospray source may provide first charged ions or second charged ions to the quadruple. In some embodiments, the first charged ions are cations and the second charged ions are anions. In some embodiments, the first charged ions are anions and the second charged ions are cations. In some embodiments, the electrospray source provides cations. In some embodiments, the electrospray sources provides anions. In some embodiments, the mass spectrometer comprises an electrospray source that provides cations and an electrospray source that provides anions. In some embodiments, the electrospray source provides cations to the quadruple and then provides anions to the quadruple, as shown in FIG. 1A. In some embodiments, the electrospray source provides anions to the quadruple and then provides cations to the quadruple. Illustratively, modified ions are formed when anions and cations contact one another in the trap.

The quadruple is located between the electrospray source and the trap, as shown in FIG. 1A. In some embodiments, the quadruple is configured to mass select ions for the trap.

The trap is located between the quadruple and the ion mobility cell. In some embodiments, the trap is configured to hold a first ion so that it may subsequently react with the mobility modifier to form the mobility-modified ions, as suggested in FIGS. 1A-B. In some embodiments, the trap is filled with helium. In some embodiments, mobility-modified ions are gated out of the trap by lowering the trap gate potential for a fixed time and by reapplying a traveling wave to the trapping region. In some embodiments, the trap gate is lowered from 12 V to −3V. In some embodiments, the fixed time is about 500 ms. In some embodiments, the trap is at a voltage to increase complex formation and to minimize proton transfer. In an embodiment, the trap is at 10 V to about 40 V relative to an adjacent helium cell. In illustrative embodiments, the trapping region of the trap cell may be about 40 V, the transfer region may be about 30 V, and the entrance to the helium cell may be about 10V.

In some embodiments, anions or cations are introduced through the stepwave region through the quadrupole, where reagents were isolated by their m/z and fill the trap. In some embodiments, cations or anions are introduced by the sample probe through the stepwave and specific charge states of interest were isolated by the quadrupole. In some embodiments, the potentials in the trap cell are chosen to maintain an excess population of anions or cations in the presence of cations or anions, respectively. In some embodiments, reaction products, i.e., the modified ions, are gated from the trap for 500 μs into the helium cell by lowering the potential on the exit gate for 500 μs. In some embodiments, DC biases on the optics are chosen such that potentials become gradually more positive (attractive) to the anions into the trap. In some embodiments, DC biases on the optics are chosen such that potentials become gradually more negative (attractive) to the cations into the trap.

In illustrative embodiments, the modified ions pass from the trap to the ion mobility cell. In some embodiments, the ion mobility cell is filled with nitrogen. In some embodiments, a repulsive (more negative) DC voltage is applied at the entrance of the helium cell to prevent anions from leaking out of the trap. Illustratively, after a first ion is provided to the trap, the potentials are switched on the ion optics to provide a negative-going voltage gradient from the source to the trap, drawing cations into the ion trap, or vice-versa. A small negative voltage is applied to the entrance of the trap relative to the trap bias in order to prevent anions from leaking out the front of the trap while cations are still filling the trap.

In some embodiments, the mass spectrometer comprises a helium cell between the trap and the mobility cell. Illustratively, the helium cell may be configured to collisionally cool ions upon transfer between the trap and the mobility cells with low energy collisions between mbar pressures of helium and the ions.

The mobility cell is configured to separate ions by their ion mobility. In illustrative embodiments, the products from the trap cell are separated by their mobilities in the mobility cell. The mobility cell may be filled with several mbar nitrogen gas. The electrodes may have a traveling wave applied to drag the ions through the cell as they collide with the nitrogen molecules to provide for the mobility separation.

In some embodiments, the mass spectrometer includes an ECD cell subsequent the mobility cell, as shown in FIG. 4. Illustratively, the ECD cell can provide gas-phase structural information. In some embodiments, the ECD cell can cooperate to provide three-dimensional structures of intact proteins through the combined IM/CXMS approach and give information about the entire primary sequence, stoichiometry, and site specificity of cross-linkers and post-translational modification.

As described above, the ions can be generated from small molecules, proteins, peptides, carbohydrates, or lipids. In some embodiments, the ions are generated from a sample comprising a mixture of at least two of the foregoing, for example two peptides. In some embodiments, the two peptides are unresolvable in the mobility cell unless at least one of the peptides has been contacted by a mobility modifier. In some embodiments, the ions are generated from a solution comprising a peptide, a mixture of peptides, or a mixture of peptides and other ions. In some embodiments, the peptide or mixture of peptides is from digesting a solution comprising a protein. In some embodiments, the ions are generated from a solution comprising a protein, a mixture of proteins, or a mixture of proteins and other ions. In some embodiments, the methods described herein are capable of resolving isomers such as isomeric peptides or isomeric carbohydrates. Illustrative ionizable groups on the ions includes amines, carbonyls, carboxylates, guanidiniums, ureas, phosphates, sulfates, or any suitable alternative.

In illustrative embodiments, the mobility modifier is configured to interact with an ion as described herein to form a complex. In some embodiments, the mobility modifier forms an ionic bond, a covalent bond, or both an ionic bond and a covalent bond with the ion. In some embodiments, more than one mobility modifier complexes with the ion. For example, if a peptide has more than one ionizable group, the peptide is capable of interacting with more than one mobility modifier. Illustratively, the mobility-modified ion behaves differently in the ion mobility trap compared to a non-modified ion.

Illustrative mobility modifiers include commercially available dyes and small molecules comprising ionizable groups such as sulfonates, phosphates, phosphonates, carboxylates, quaternary ammonium salts, primary amines, guanidiniums, metal ions, and the like. In some embodiments, the mobility modifier is an organic dye. In some embodiments, mobility modifiers comprise at least one, at least two, or at least three ionizable groups. In some embodiments, the mobility modifier is of sufficient charge to invert the charge of the ion. For example, if the ion in the trap cell has a 2$^+$ charge and the mobility modifier has a 3$^-$ charge, the resulting modified ion would have a 1$^-$ charge. In some embodiments, the mobility modifier includes a covalent cross-linking group in addition to the ionizable group. Illustrative cross-linking groups include aldehydes, anhydrides, thiols, maleimides, activated esters, ketenimide, isoxazolium, acyl halogens, azides, carbenes, hydrazides, or any suitable alternative. In some embodiments, the activated ester comprises a succinimide such as N-hydroxy succinimide. In some embodiments, the mobility modifier is 4-formylbenzene-1,3-disulfonic acid disodium salt hydrate (FBDSA), 1-Hydroxy-7-azabenzotriazole (HOAT), 1-Ethyl-3-(3-dimethylaminopropyl) carbodiimide hydrochloride (EDC), or 2,2,3,3,4,4,5,5,6,6,7,7,8,8,8-pentadecafluoro-1-octanol (PFO). In some embodiments, the mobility modifier is an aryl sulfonate, such as

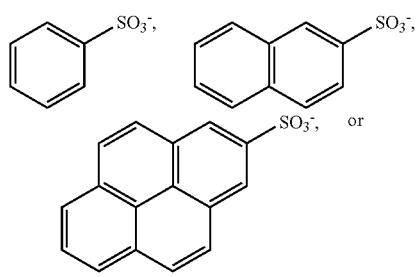

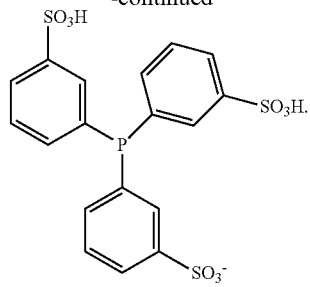

In some embodiments, sulfobenzoic acids can be coupled to amine-containing compounds with EDT and NHS coupling.

In some embodiments, the sample comprises a protein. In some embodiments, this present disclosure can be used as a tool for high-throughput characterization of primary, secondary, tertiary, and quaternary protein structure. Structural levels of a protein can be measured within the same experiment, increasing both speed and accuracy. The methods described herein are flexible, as reagents with different linker lengths can be swapped between experiments. By performing these measurements in the gas-phase, it may be possible to fully characterize protein structures in less than an hour. This increase in throughput can result in improved efficiency of protein analysis, and potentially, decreased research costs in biomedical/pharmaceutical protein and protein/binding research. This technology may enable high-throughput screening of protein structures as a function of changes in structure. Proteins under many different conditions (treated with different drugs/ligands in a 96-well plate, different pH, etc.) can be screened for collision cross section (CCS, i.e., overall size and shape) changes and localized structural changes. This information applies to soluble and membrane proteins and protein complexes that may be difficult or impossible to measure via traditional biophysical methods.

The methods of the present disclosure can allow for protein folding, binding, and overall structure determination at the single amino acid residue level to make discoveries of dynamics and structure for currently intractable protein systems. The combination of gas-phase CXMS and native IM/MS can produce data in timescales that can be useful in clinical and pharmaceutical settings. In these settings, increases in speed and decreases in cost (both computationally and monetarily) can lead to breakthroughs, especially for systems with dynamics or intrinsically disordered regions, common in signaling and pathways for diseases such as Parkinson's, Alzheimer's, and cancer. In another aspect, the gas-phase structures can be defined in terms of topology and localized structure. Comparing these results to solution phase can address gaps between structural evaluations in solution vs. gas.

EXAMPLES

Example 1

These examples describe 1) Gas-phase covalent cross-linking of proteins for structural analyses; 2) IM/MS with cross-linking in a fully gas-phase paradigm for structural information; 3) These measurements are flexible, as reagent chemistries can be rapidly changed; 4) Cross-linking protocols take hours/overnight depending on sample preparation—with the gas-phase paradigm, these experiments can be completed in less than a minute; and 5) The inherent speed of the methods described herein make measurements much more responsive to protein dynamics.

Structural mass spectrometry can describe that proteins are either measured intact under "native" solution conditions or are modified by covalent labeling strategies, including cross-linking, in solution, followed by enzymatic digestion. These techniques provide protein structural information. However, current intact methods lack the necessary information to localize folding and protein/protein or small molecule interactions. Cross-linking methods do not directly provide the overall size/shape of the protein, and the solution cross-linking chemistry, enzymatic digestion, and cleanup/separation limit high-throughput analysis. The methods described herein couple cross-linking and native IM/MS analysis into one gas-phase mass spectrometry experiment. This can allow for rapid cross-linking analysis and provide multiple complementary measures of gas-phase protein structure.

The method described herein uses high-throughput IM/MS-only analyses for structural characterizations and measures of dynamic protein systems. In some aspects, the method may modify an IM/MS for ion/ion reactions before the IM separation and the implementation of an ECD cell following the IM separation. Gas-phase ion chemistry shows that covalent reactions in the gas-phase can be efficient and occur on an analytically relevant timescale (i.e., tens to hundreds of milliseconds). Desired performance characteristics for the methods described herein include accuracy and precision of CCS measurements (reproduce within 5% of previously measured CCS), selectivity (IM separation of cross-linked proteins and fragments from the unmodified forms), and speed (complete each scan on a one second or less timescale). The methods described herein can use gas-phase cross-linking and native IM/MS to maximize speed and information content, which can allow for determining mechanisms of disease and opportunities for treatment by protein conformational changes and changes to protein complexes.

In some embodiments, the method and apparatus described herein traps ions from a mixture of compounds in an aqueous/organic sample and traps negative ions from an aqueous/organic sample that are reactive for specific chemical properties. The apparatus may include two separate sprayers controlled by power supplies operated in opposite polarities that are turned on and off sequentially. The method or apparatus described herein may include modification of a commercially available electrospray source, with the sample probe used to make ions from the mixture and the reference probe used to make the ions are held in a reaction chamber for a time (e.g., seconds or less), and injected into an ion mobility spectrometer, where reaction products are injected into the ion.

Example 2

The method in this example can be performed to increase the structural information obtained from IM/MS analysis, to increase the throughput of CXMS, and to measure site-specific distance constraints of gas-phase protein structures. This example can develop a combined gas-phase cross-linking ion/ion reaction and IM/MS technology. This can be accomplished by using pulse positive and negative nano-electrospray ionization sources into a trapping region before the IM cell. A reaction between the protein cation and cross-linker anion can produce the cross-linked product, which can be dissociated with fragment ions separated by IM or left intact for CCS measurement. This method can cross-link a variety of monomeric and multimeric proteins in the gas-phase and measure changes in CCS between cross-linked and unmodified proteins, as well as between solution and gas-phase cross-linked proteins. Further, these measurements can be about 1 second per experimental cycle, which could allow for high throughput for in-depth structural studies.

Though solution-phase CXMS can give information about protein folding and connectivity, protein structures can change between the solution phase and the gas phase (i.e. during ionization and in the instrument source optics leading to the IM measurement). Since IM measures proteins as gas-phase ions, the IM structure may or may not directly correlate to protein structures either in solution or their native environment in vivo. Under some conditions (i.e., weak electric fields and ambient temperature), the CCS from stable, globular proteins can match calculations derived from NMR and X-ray structures and FTIR assignments. CCS is a measure of overall ion shape/size, dependent on ion mobility, temperature, buffer gas number density, and the reduced mass of the collision between the ion and buffer gas. However, ion temperatures can increase due to collisional heating if pressures and injection energies are not carefully controlled. The increase in temperature can cause smaller proteins and peptides to change conformation. Some non-globular proteins can collapse in the gas-phase, giving CCS values smaller than expected from the crystal structure. In contrast, cytochrome C ions formed from native-like conditions (ammonium acetate at pH 7.0) and analyzed with gentle conditions were shown by CCS measurement to retain their initial folded states for the tens of millisecond time scale. Structures retained features of their solution states for over a second. Protein CCS measurements can include cross-linking and the addition of salts in solution to stabilize the initial, native-like structures. By cross-linking the initial structures in the gas-phase prior to IM and tandem MS, structures can be stabilized for the length of the experiment. Cross-linking experiments can also provide gas-phase structural information complementary to IM/MS measurements.

Example 3

Gas-phase cross-linking with N-hydroxy succinimide (NHS) chemistry via ion/ion reactions inside of mass spectrometers can be accomplished for peptides and the protein ubiquitin. These reactions can require the presence of an electrostatically "sticky" group to form a long-lived complex. Additionally, modification of peptide non-covalent complexes can be accomplished by solution derivatization of residues with diazirines followed by gas-phase cross-linking through photodissociation. However, only the ion/ion reaction method is rapid (mass spectrometer timescale, requires no solution chemistry), and neither method gives the overall structure. For the ion/ion study with ubiquitin, cross-links were determined between lysines K48-K63 and K27-K29. These match solution cross-linking (sites obtained by tandem MS of the intact protein). However, a technique measuring the overall gas-phase structure (e.g., IM) can confirm structural evidence from gas-phase cross-linking.

Example 4

Cross-linking Ion/Ion Reactions on an IM/qTOF with Dual Nanoelectrospray Ion Sources. This example is directed to the ion/ion reaction capability for dual nanoelectrospray sources on an IM/MS instrument (FIGS. 1A-C). A commercially available ion source can be used. The built-in electron transfer dissociation (ETD) mode can be used, as this controls the ion/ion reaction sequence (as ETD is an ion/ion reaction), eliminating the need to develop instrument control sequences. This method can be used for a cross-linking ion/ion reaction between the peptide melittin and the N-hydroxysuccinimide (NHS) ester cross-linker sulfo-EGS32. This reaction can cross-link the melittin N-terminus with lysine 7, and lysine 21 with lysine 23 (FIG. 2). The peptide can either be shuttled into the mobility cell with low energy to dissociatively lose the leaving group or with higher energy to yield sequence fragmentation. The IM cell can separate the resulting products. After IM separation, another round of collision-induced dissociation (CID) in the transfer cell can be used to fragment the intact cross-linked peptide or fragment the sequence fragments to gain higher sequence coverage.

This method can lead directly to implementing cross-linking reactions with intact proteins. Data can be obtained from the built-in acquisition software for IM/MS data and the locations of linking sites can be determined by freely available software such as Prosight Lite.

Example 5

Covalent Cross-Linking with Ion/Ion Reactions on an IM/qTOF.

This example is directed to cross-linking ion/ion reactions with intact proteins. Protein charge states isolated by the quadrupole can be co-trapped with anions of amine-reactive cross-linkers. The ion/ion products can be injected with low energy for CCS measurement and to drive off the bound leaving group (i.e., sulfo-NHS). The effects of different amounts of injection energy upon the CCS can be evaluated. Once the cross-linking reaction has occurred, the addition of small amounts of energy may not lead to unfolding. High energy injections into the mobility cell may produce cross-linked sequence fragments that will be IM separated. Model proteins such as ubiquitin, cytochrome C, and myoglobin can be used to study folding/three-dimensional structure for monomeric proteins. Intact protein complexes such as intact transthyretin (TTR), avidin, and alcohol dehydrogenase can be modeled for the determination of quaternary structure. These proteins can be cross-linked in solution to compare the mass and CCS of the intact cross-linked proteins to analyze the solution and gas-phase cross-linking affect protein structure. This may provide evidence that both cross-linking methods are probing the same original protein structures. This example can create a rapid structural analysis workflow, entirely in the gas-phase. Additionally, the results from the model proteins with CCS values in the literature, with and without cross-linking can be compared. Finally, these reactions can give more detail on the nature of the gas-phase protein three-dimensional structure than is obtained by IM/MS alone. Obtaining data and data analysis can proceed through the same tools used for the previous task, analyzing the data to determine the presence of cross-linked proteins and cross-linked sequence fragments. The expected outcome is the ability to perform CXMS in the gas-phase with IM/MS measurements of intact, cross-linked proteins and, with CID, generate cross-linked sequence fragments that are indicative of solution structures.

Example 6

This example addresses a possible lack of observation of the dissociative loss of the leaving group (e.g., sulfo-NHS). This can occur due to two possibilities: 1.) the reactions are too slow to occur on the MS timescale without supplying additional energy to the system or 2.) if the barrier for loss of the leaving group is high. The latter of these occurs if the reaction occurs, but there is not enough energy to over-come the barrier to losing the leaving group. The CCS of gas and solution-phase cross-linked proteins can be compared to determine whether additional energy supplied in the form of collisional activation affects the structure. Structural changes can affect the availability of cross-linking sites, such that there will be a substantial change in the CCS and the identified cross-linked sites. Thus, the threshold for conformational change by collisional activation can be measured, and energy to overcome the covalent reaction barrier can be increased up to this point to drive covalent bond formation without altering the structure. If the cross-linked sites are the same in gas and solution cross-linking, the structure interrogated by gas-phase cross-linking is likely similar to the solution structure, even if the CCS indicates the structure has changed (i.e., cross-linking occurs prior to the change in structure). Using reagents where the "sticky" group is not directly bound to the leaving group can also be used. In this case, the barrier for neutral loss of the leaving group will be significantly lower. Therefore, much less energy may be required to observe the mass spectral signature for covalent modification.

Example 7

IM Combined with Tandem MS to Determine Cross-Linking Locations for Intact Proteins.

This example describes a mass spectral determination of structure via gas-phase methods and to perform these measurements without extensive sample preparation and separation steps. This method can allow for high coverage gas-phase sequencing of cross-linked proteins for primary, secondary, tertiary, and quaternary structure determination. This example uses a combination of CID and ECD to improve sequence coverage. This method can sequence intact cross-linked proteins on the sub-second timescale to identify cross-linked residues, determining 3D structure. This method can determine cross-linked sites for intact proteins generated by either gas-phase or solution-phase cross-linking. This example can provide a direct comparison of the locations of cross-linked sites generated from cross-linking in either gas or solution.

CXMS without protein digestion was used to study of ubiquitin cross-linking in solution using a lysine-specific linker. Introducing the intact protein to the mass spectrometer (i.e., the top-down approach) can have advantages, including the elimination of the need for chromatographic separations of proteolytic peptides and cross-linked multimers from monomers. Another important advantage is the ability to measure intact mass for stoichiometry and type of modifications to the protein through gas-phase sequencing (e.g., with CID). However, though the top-down strategy has many advantages, CID often does not yield adequate sequence coverage of the entire protein. The lack of coverage can lead to the inability to assign cross-linked sites, if, for example, more than two residues reactive to linkers occur in the fragment ion sequence. Increase in sequence coverage is a critical need.

MS3, where sequence fragments are mass-selected and fragmented again by CID for more coverage may increase sequence coverage. MS3 is useful for locating modifications (e.g., post-translational modifications and chemical covalent modifications) when the first-generation fragment ions include multiple possible modification sites. A pseudo-MS3 experiment, where ions are mass selected, fragmented, then mobility selected and fragmented again can be used. The IM separation can be used to separate CID-generated cross-linked peptides, reducing spectral congestion and aiding in identification and analysis. Another improvement to sequence coverage can be to use additional fragmentation methods that give complementary sequence coverage, including the low-energy electron fragmentation methods electron capture dissociation (ECD, where low energy electrons are generated from a filament) or electron transfer reaction (ETD, an ion/ion reaction with a radical anion). An ECD cell can be used with IM/qTOF instrumentation. ECD can be combined with IM/qTOF and ion/ion reactions on a single platform to facilitate informative gas-phase structural studies. This example can characterize three-dimensional structures of intact proteins through the combined IM/CXMS approach and give information about the entire primary sequence, stoichiometry, and site specificity of cross-linkers and post-translational modifications. Thus, losses or changes to cross-linked peptides through multiple chromatography steps can be avoided and a pure form of the intact protein without non-specific aggregates is studied via m/z isolation in the mass spectrometer. The combination of ECD and CID can give fragmentation, aiding in identifying modification sites. The IM separation can be used to separate CID-generated cross-linked peptides, greatly reducing spectral congestion and aiding in identification and analysis.

Example 8

Collision Induced Dissociation of Intact Cross-Linked Proteins for Cross-Linking Site Determination.

This example is directed to using CID to determine the locations of cross-linking. Proteins can be cross-linked in either the solution or gas phase and use IM to measure the CCS of cross-linked proteins, followed by CID to produce cross-linked sequence fragments. CID can be used before the IM cell to enable separation of cross-linked fragments by mobility, which may result in less complex mass spectra, aiding in analysis. Finally, CID can be combined before and after the IM separation for pseudo-MS3, yielding fragments of fragments for better-localized sequence coverage. Model proteins such as ubiquitin and avidin can be used. This example can examine cross-linked proteins produced by the gas-phase approach and for solution-phase cross-links. This approach does not require up-front separation and avoids losses from chromatography. The approach can measure intact mass, stoichiometry, PTMs, and cross-links. Built-in acquisition software can be used to obtain data and use tools such as Prosight to determine the locations of cross-links by comparing to the fragmentation pattern from unmodified proteins and fragment peptides. This example can determine the cross-linking sites of intact, cross-linked proteins (FIGS. 3A-C). Also, this example provides all the advantages of top-down proteomics, such as information about molecular weight and stoichiometry of modifications, with the entire sequence available in the gas phase. This method can be used to measure the CCS of cross-linked and unmodified proteins, comparing any changes in overall structure due to the cross-linking process for both solution and gas-phase cross-linking workflows.

Example 9

Integration of Electron Capture Dissociation with Ion Mobility Mass-Spectrometry for Enhanced Sequence Coverage.

This example is directed to installing an ECD cell following the IM cell to provide sequence coverage complementary to CID. The efficacy of the cell can be tested by using it to fragment both cross-linked and unreacted intact proteins, utilizing proteins from the subset mentioned earlier, and analyzing sequence fragments. This approach can be combined with CID beforehand for pseudo-MS3 with ECD as the second step. Additionally, CID can be used after ECD if needed for additional sequence coverage (FIG. 4). The ECD of this method can produce fragments complementary to the results from CID, giving more structural information than from CID alone. Second, the ECD cell can be used in transmission mode with no additional trapping steps needed, keeping the duty cycle the same. Large proteins with many degrees of freedom are often not sequenced effectively by CID, but ECD has been shown to be effective for larger proteins, with many more cleavage sites. Data can be acquired through built-in acquisition software and analyzed with freely available top-down tools. This example can be used to obtain complementary sequence coverage, allowing for a much more precise ability to determine specific cross-linking sites.

Example 10

This example is directed to steps if the CID before the IM cell may not efficiently produce fragment ions. If this happens, CID and ECD can be used in a combined approach after the IM separation. The utility of the IM separation is not lost, as IM can separate mixtures of intact, cross-linked proteins and measure their CCS. If ECD in transmission-mode is not efficient, the instrument can be adapted for photodissociation or electron transfer dissociation ion/ion reactions. If the fragmentation does not provide enough sequence coverage to determine cross-linking sites, results can be compared from intact cross-linked proteins and proteins resulting from limited cleavage of multimeric protein complexes into subunits by solution methods or limited enzymatic cleavage of solution-phase cross-linked proteins. The subunits can also be individually intramolecularly cross-linked in the gas phase, allowing for native-like analysis in the gas-phase to still occur.

This example can use the speed and specificity of gas-phase ion/ion cross-linking and IM/MS for gas-phase structural measurements. These results from tandem mass spectrometry may yield enough sequence coverage to unambiguously identify cross-linked sites. Finally, cross-linking sites may match the cross-linking sites produced by solution cross-linking and that the CCS may show that structures do not change as compared to the solution structures.

These examples can use ion/ion reactions to cross-link melittin; and 2) use CID after the reaction to determine the locations of the modification sites.

These examples can 1) covalently cross-link the model proteins ubiquitin, cytochrome C, myoglobin, TTR, avidin, and alcohol dehydrogenase; 2) cross-link each of these proteins in solution; and 3) measure the CCS and intact mass before cross-linking, after gas-phase cross-linking, and after solution-phase cross-linking. These CCS values of the intact proteins may match literature values within 5% relative error.

These examples can: 1) use CID after measuring CCS to determine the sites of cross-linking for protein monomers (i.e., ubiquitin, cytochrome C, myoglobin); and 2) implement CID prior to the IM separation, using IM to separate fragments by their mobilities, and using CID after the IM cell for further analysis of cross-linking sites in a pseudo-MS3 workflow.

These examples can: 1) modify the transfer cell to include an ECD cell; 2) use ECD to fragment cross-linked proteins for linker site determinations; 3) demonstrate ECD in tandem with CID; and 4) demonstrate over 50% sequence coverage and un-ambiguously identify cross-linked sites.

These examples can be used to measure proteins in complex mixtures, isolate them with mass spectrometry, and analyze their structures with this technology. These examples can be coupled with online separations such as ion-exchange chromatography to maintain native structures. Applying the techniques described in these examples can allow for possibilities of structural analyses conducted upon entire proteomes.

Materials

Bovine serum albumin digest was dissolved in a 50/50/0.1 vol/vol/vol solution of water/acetonitrile/formic acid at 0.5 pmol/µL. Sulfo-benzoic acid or other reagents are used at a 1-10 mM concentration in various organic solvents (most commonly acetonitrile). Samples were infused by infusion pump at flow rates ≤1 µL/min Instrumentation All experiments were performed on a Synapt G2-Si HDMS mass spectrometer (Waters Corporation, Wilmslow, U.K.) with electron transfer dissociation (ETD) equipped with the NanoLockspray source with the baffle between the two sprayers removed. The NanoLockspray source contains two nanoelectrospray (nESI) probes, which were used for sequential anion and cation ionization. Cations and anions were infused through the sample and reference sprayers, respectively, at flow rates less than 500 nl/min ETD and mobility modes were used with ETD refill times and intervals of 1 s each. Waters Research Enabled Software (WRENS) was used to apply a 1.5 kV potential to the sample probe during the sample injection phase of the ETD scan function and a −2 kV potential to the reference probe during anion fill. This was accomplished by first decoupling the reference probe from its power supply. Second, the glow discharge voltage source was decoupled from the discharge pin and directly wired to the reference probe. WRENS was also used to ensure proper synchronicity between spray voltages and instrument lenses. Briefly, the mass spectrometer scan function is as follows: anions were introduced by the reference probe through the stepwave region and the quadrupole, where reagents were isolated by their m/z and filled the trap. Next, cations were introduced by the sample probe through the stepwave and specific charge states of interest were isolated by the quadrupole. Reaction products were gated from the trap for into the helium cell by lowering the potential on the exit gate for 500 ms. Next, ions traversed the IM cell filled with $N_2$ and the transfer cell that contained argon gas. The potential differences between the two sections of the trap, the helium cell, the IM cell, and the transfer cell were tuned to maximize transmission of ion/ion reaction products or increased to effect collision induced dissociation (CID). Ions were mass analyzed by the time-of-flight MS in Resolution Mode (nominal resolving power of 20,000 FWHM).

The Waters Synapt series of instruments is equipped with the ability to perform ETD. A discharge voltage is applied to the needle to form gas-phase radical anions of the ETD reagents by glow-discharge ionization. The only modification necessary for ESI/ESI reactions was to use the second ESI source (the reference probe) to generate anions instead of the glow discharge source. This modification was performed by removing the discharge voltage wire from the discharge pin and attaching it to the reference probe. A simple WRENS script allowed the application of negative and positive ESI voltages to the reference and sample probes synchronized to the anion fill and cation fill, respectively. The ETD reagent container was left empty and the nitrogen flow through the container was disabled. No other aspects of the instrument or instrument control were modified.

Anions are mass selected by the quadrupole and enter the trap stacked ring ion guide, filled with helium (~0.07 mbar, 18 mL/min helium flow rate). DC biases on the optics are chosen such that potentials become gradually more positive (attractive) to deliver the anions into the trap. During injection of the anion (and cation), there is no traveling wave in the trap. Next, cations are injected. The potentials are switched on the ion optics to provide a negative-going voltage gradient from the source to the trap, drawing cations into the ion trap. After the cation fill, products are gated out of the trap by lowering the trap gate potential (from 12 V to −3V in this case) for a fixed time (500 ms) and by reapplying a traveling wave to the trapping region (typically at traveling wave height <1V). These events and voltages are all directly controlled from the commercially available version of Mass-Lynx.

Many capabilities required for covalent ion/ion reactions exist in the commercial implementation of ETD in the Synapt platform. These capabilities include: (1) Isolation of reagent and analyte ions by their m/z, (2) An RF-confining region to mutually store cations and ions, (3) The ability to form the covalent reaction product by CID prior to the IM cell (i.e., between the trap and He cell regions), (4) Separation of products from reactants in the mobility cell, and (5) CID of the mobility-separated products in the transfer cell. Therefore, the voltage diagram shown in FIG. 5D can also be used for ESI/ESI ion/ion reactions.

Example 12

Covalent Labelling
Materials

Human angiotensin I (DRVYIHPFHL; SEQ ID NO: 6), ubiquitin from bovine erythrocytes, myoglobin from horse heart, ammonium acetate, 2,2,3,3,4,4,5,5,6,6,7,7,8,8,8-pentadecafluoro-1-octanol (PFO), and 4-formylbenzene-1,3-disulfonic acid disodium salt hydrate (FBDSA) were purchased from Sigma-Aldrich (St. Louis, MO). 1-Hydroxy azabenzotriazole (HOAT) was purchased from TCI America (Portland, OR). 1-Ethyl-3-(3-dimethylaminopropyl) carbodiimide hydrochloride (EDC) was purchased from Thermo Scientific (Rockford, IL). Formic acid, acetonitrile, and N,N-dimethyl formamide (DMF) were purchased from Fisher Scientific (Fairmont, NJ). 3-Sulfobenzoic acid monosodium salt was purchased from Alfa Aesar (Ward Hill, MA). Angiotensin was dissolved in a 50/50/0.1 vol/vol/vol solution of water/acetonitrile/formic acid at 100 nM. FBDSA was used at a 1 µM concentration in 50/50 water/acetonitrile. Myoglobin was prepared at 1 µM in 50/50/0.1 water/acetonitrile/formic acid. Ubiquitin was dissolved in an aqueous 200 mM ammonium acetate solution at 1 µM. 10 mM Sulfo-benzoyl-HOAT was synthesized by a previously published procedure and used at 10 mM in acetonitrile. PFO was dissolved in water/acetonitrile at a concentration of 1 mM of the dimer.

Instrumentation

All experiments in this example were performed on a Synapt G2-Si HDMS mass spectrometer (Waters Corporation, Wilmslow, U.K.) with electron transfer dissociation (ETD) equipped with the NanoLockspray source with the baffle between the two sprayers removed. The NanoLockspray source contains two nanoelectrospray (nESI) probes, which were used for sequential anion and cation ionization Cations and anions were infused through the sample and reference sprayers, respectively, at flow rates less than 500 nL/min. ETD and mobility modes were used with ETD refill times and intervals of 1 second each. Waters Research Enabled Software (WRENS) was used to apply a 1.5 kV potential to the sample probe during the sample injection phase of the ETD scan function and a −3 kV potential to the reference probe during anion fill. This was accomplished by first decoupling the reference probe from its power supply. Second, the glow discharge voltage source was decoupled from the discharge pin and directly wired to the reference probe. WRENS was also used to ensure proper synchronicity between spray voltages and instrument lenses. Briefly, the mass spectrometer scan function is as follows: anions were introduced by the reference probe through the stepwave region through the quadrupole, where reagents were isolated by their m/z and filled the trap (FIGS. 5A-D). Next, cations were introduced by the sample probe through the stepwave and specific charge states of interest were isolated by the quadrupole. The potentials in the trap cell were chosen to maintain an excess population of anions in the presence of cations, as the apparent reaction rate of ion/ion reactions is dependent on the number density of reagent ions. Reaction products were gated from the trap for 500 μs into the helium cell by lowering the potential on the exit gate for 500 μs. Next, ions traversed the IM cell filled with $N_2$ and the transfer cell which contained argon gas. The potential differences between the two sections of the trap, the helium cell, the IM cell, and the transfer cell were tuned to maximize transmission of ion/ion reaction products or increased to effect collision induced dissociation (CID). Ions were mass analyzed by the time-of-flight MS in Resolution Mode (nominal resolving power of 20,000 FWHM). Mobility-selected mass spectra were extracted using the MS data station software (MassLynx V4.2).

Results

Implementation of ESI/ESI Ion/Ion Reactions on the Waters Synapt Platform

The Waters Synapt series of instruments is equipped with the ability to perform ETD. This is implemented as follows: the ETD reagent (often a crystalline solid) is placed in a sealed metal container where nitrogen that is swept through the container delivers the neutral reagents to a discharge needle located after the first conductance-limiting orifice of the instrument. A discharge voltage is applied to the needle to form gas-phase radical anions of the ETD reagents by glow-discharge ionization. Anions are mass selected by the quadrupole (FIG. 5A) and enter the trap stacked ring ion guide, filled with helium (~0.07 mbar, 18 ml/min helium flow rate). DC biases on the optics are chosen such that potentials become gradually more positive (attractive) to the anions into the trap. During injection of the anion (and cation), there is no traveling wave in the trap. Typically, a repulsive (more negative) DC voltage is applied at the entrance of the helium cell to prevent anions from leaking out of the trap. Next, cations are injected (FIG. 5B). The potentials are switched on the ion optics to provide a negative-going voltage gradient from the source to the trap, drawing cations into the ion trap. A small negative voltage is applied to the entrance of the trap relative to the trap bias in order to prevent anions from leaking out the front of the trap while cations are still filling the trap. After the cation fill, ETD products are gated out of the trap by lowering the trap gate potential (15 V in this case) for a fixed time (500 μs) and by reapplying a traveling wave to the trapping region (typically at traveling wave height <1 V) (FIG. 5C). A voltage diagram showing the conditions for the three states of the experiment (anion fill, cation fill, ion ejection from the trap) is given in FIG. 5D. These events and voltages are all directly controlled from the commercially available version of MassLynx. The ETD products then traverse the helium cell and are separated by their mobilities in the mobility cell, travel through the transfer cell, and are mass analyzed by the time-of-flight. The transfer cell is filled with argon (~0.01 mbar, 1 ml/min argon flow rate) and is divided into two regions which are separately biased. By increasing the bias, the transfer collision energy is increased, allowing for collisional activation and/or CID after ions exit the mobility cell. Thus, CID product ions will have the same drift time as their precursors.

Many capabilities required for covalent ion/ion reactions exist in the commercial implementation of ETD in the Synapt platform. These capabilities include: 1. Isolation reagent and analyte ions by their m/z, 2. An RF-confining region to mutually store cations and ions, 3. The ability to form the covalent reaction product by CID prior to the IM cell (i.e., between the trap and He cell regions), 4.) Separation of products from reactants in the mobility cell, and 5.) CID of the mobility-separated products in the transfer cell. Therefore, the voltage diagram shown in FIG. 5D is also used for ESI/ESI ion/ion reactions. For ESI/ESI reactions, the system was modified to use the second ESI source (the reference probe) to generate anions instead of the glow discharge source. This modification was performed by removing the discharge voltage wire from the discharge pin and attaching it to the reference probe. A simple WRENS script allowed the application of positive and negative ESI voltages to the reference and sample probes synchronized to the anion fill and cation fill, respectively. The discharge voltage source was changed in WRENS from 100 μA mode to 35 μA mode to enable the application of potentials between 0 to −8 kV to the reference probe (in 100 μA mode, only potentials from 0 to −2 kV can be realized). The ETD reagent container was left empty and the nitrogen flow through the container was disabled.

Angiotensin $3^+$ and FBDSA$^-$

Triply protonated angiotensin I and singly deprotonated FBDSA were reacted in the initial implementation of ESI/ESI ion/ion reactions. This reaction has been directly adapted from previous work on a linear ion trap mass spectrometer. A Schiff base is formed between a primary amine and aldehyde with water as a leaving group. Long-range coulombic attraction brings the two species together at rates proportional to the square of the charge. The FBDSA reagent is bifunctional, containing both sulfonate and aldehyde functional groups. The high proton affinity of sulfonate results in the stable formation of a long-lived electrostatic complex, with the sulfonate "anchored" to either an ammonium (protonated lysine) or guanidinium (protonated arginine) group. These electrostatic binding strengths have been estimated to be about 28 kcal/mol for binding to protonated lysine and 61 kcal/mol for binding to arginine. Once electrostatically anchored, the main barrier for observing the reaction products is covalent bond formation. Heating the electrostatic complex via energetic collisions provided a mixture of covalently modified peptides and proton transfer products. The relative sizes of these two fragmentation channels are controlled by the nature of the covalent chemistry and the amount of energy applied to the system. Specifically, the observation of covalent chemistry is maximized if collision energies are chosen above the activation energy for covalent bond formation (less than 20 kcal/mol) but below the activation barrier for proton transfer (i.e., neutral loss of FBDSA).

The mass spectrum resulting from the ion/ion reaction of angiotensin 3+ and FBDSA (FIG. 6D) shows the formation of two products: the charge-reduced angiotensin molecular ion $[M+2H]^{2+}$ and the electrostatically bound complex $[M+3H+FBDSA]^{2+}$. For this experiment, the trap traveling wave voltage was 0.2 V with a wave speed of 300 m/s. Under these conditions, the precursor triply charged angiotensin has been virtually completely reacted away. The formation of covalent products (i.e., neutral loss of water from the electrostatic product) and sequence ions containing the covalent modification are observed in FIG. 6A by increasing the DC bias between the trap cell (0.1 mbar He) and the helium cell (4 mbar He) to 95 V, the helium cell and the IM cell (2.8 mbar $N_2$) to 50 V, and the IM cell and the transfer cell (0.025 mbar Ar) to 35 V. The ion/ion reaction products and their sequence fragments share identical drift times in their arrival time distributions (ATD) since fragment ions were not formed until after IM separation (FIG. 6B). This is illustrated by FIG. 6C for the covalent modification products. The covalent modification makes the angiotensin cation significantly larger to where it is separated (40 V IM wave height, linear velocity ramp from 900 to 200 m/s) from the proton transfer peak. The mass spectrum with the same drift time as the covalently modified mobility peak shows a typical peptide fragmentation spectrum, with b and y-type ions, with the addition of covalently-modified $b_2$ and $b_3$ ions (FIG. 6C). These data alone do not provide evidence whether the modification site is on the N-terminus or the arginine, since the $b_1$ fragment is not observed, and uncharged arginine is a reactive nucleophile in the gas-phase. However, studies with high-energy CID and molecular modeling have revealed that the N-terminus is not protonated in the gas-phase, and that the arginine side chain is protonated. This indicates that Schiff base formation most likely occurs on the N-terminus. An IM separation of ion/ion products prior to their dissociation affords the ability to mass analyze all the fragments in a single experiment while directly linking the fragments to their precursors. The combination of IM and CID may eliminate the need to perform MS/MS on each of the ion/ion reaction products. Instead, all ion fragmentation can be used, and the fragments can be linked to their precursors. For example, the singly modified angiotensin fragments do not overlap with the doubly modified fragments, as they are separated by the IM cell. Thus, this method accommodates ion/ion reactions that form multiple products or ion/ion reactions of a complex mixture.

Characterization of Parameters Affecting Ion/Ion Reactions

Figure 7D:
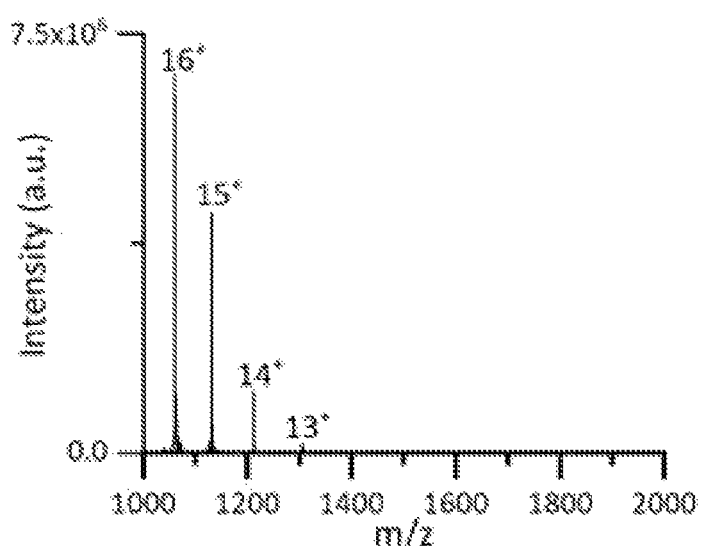

The effect of several experimental parameters on glow discharge-based reagents for ion/ion reactions in a traveling wave ion guide has been previously reported. Proton transfer ion/ion reactions between denatured apomyoglobin cations with PFO dimer anions to characterize ion/ion reactions were analyzed using the dueling nanoelectrospray source. An excess of at least ten times the ion count of anion to protein was used for observing ion/ion reaction products. This may be due to a linear relationship between the observed reaction rate and the number density of reagent for ion/ion reactions. Some parameters found to affect the ion/ion reactions were the trap traveling wave height, the trap RF amplitude, and the helium pressure in the trap. The effects of different traveling wave heights are shown in FIGS. 7A-D. FIG. 7A shows the reaction of the $16^+$ charge state of apomyoglobin with singly deprotonated PFO dimer. Under these conditions, myoglobin transfers up to seven protons, decreasing its charge to the $9^+$ charge state, with the center of the charge state distribution at the $13^+$ charge state. Increasing the traveling wave amplitude decreases the extent of reaction, with $10^+$ as the lowest charge state for 0.15 and 0.2 V wave heights (FIGS. 7B and C, respectively), and $13^+$ as the lowest charge state for 0.3 V (FIG. 7D). The base peak of the mass spectrum was $13^+$ for 0.1 V, $14^+$ for 0.15 V, $15^+$ for 0.2 V, and $16^+$ for 0.3 V. FIG. 8A summarizes these results by weighted average charge state of the distribution (Equation 1).

$$\text{Weighted Average Charge State} = \frac{\sum_{j}^{n} q_j I_j}{\sum_{j}^{n} I_j} \quad (1)$$

Charge states (q) from j to n are multiplied by I, the maximum intensity of each peak and divided by the total intensity of all charge states. The average charge state increases linearly with the traveling wave amplitude from 0.05 to 0.25 V. Above 0.25 volts, the average charge state plateaus. The shape of the curve indicates that the extent of the ion/ion reaction decreases linearly with increasing traveling wave amplitude until the reaction no longer occurs. Decreased traveling wave height results in the improved mixing of cation and anion populations, increasing the number of proton transfer events. The extent of the reaction was also increased by either greatly decreasing (~100 m/s) or increasing (several thousand m/s) the traveling wave speed (data not shown). With the decreased traveling wave speed, in the so-called "surfing condition" when ions move at the speed of the wave, the average ion drift velocities are lower, allowing for more proton transfer events to occur. With greatly increased speed, ions in traveling waves will periodically "roll over" the traveling waves, as their mobilities are too low to allow the ions to remain surfing. Again, the longer interaction times allow for a greater number of proton transfer events.

FIG. 8B shows the effects of RF amplitude ($V_{RF}$) on the extent of ion/ion reactions. In this experiment, the extent of the reaction increases between 100 and 500 $V_{RF}$. The ion cloud density increases with increasing applied $V_{RF}$. Thus, cations and anions have increased spatial overlap. With better overlap, more proton transfer events occur in the same reaction times. FIG. 8C illustrates the effects of ion trap pressure. The corresponding gas flow rates are indicated in Table 1. There is an increase in the number of proton transfers as the background helium pressure increases, as collisional cooling favors formation of the ion/ion reaction products. The background pressure becomes too high beyond 0.090 mbar in the trap, reducing signal under the experimental conditions used. As a result of these experiments, the following parameters were used in further studies: 0.1 V trap traveling wave height, 500 $V_{RF}$, and a pressure of 0.068 mbar (i.e., 18 ml/min trap gas flow rate).

TABLE 1

The effects of gas flow rate (N2) into the trap cell on observed pressure, weighted average charge state, and total ion current.

| Gas Flow Rate (ml/min) | Pressure (mbar) | Weighted Average Charge State | Total Ion Current |
| --- | --- | --- | --- |
| 3 | 0.0118 | 16.0 | 1.77E8 |
| 6 | 0.0235 | 16.0 | 2.5E8 |
| 9 | 0.0349 | 15.8 | 1.45E8 |
| 12 | 0.0461 | 14.7 | 1.81E8 |
| 15 | 0.0572 | 13.0 | 3.50E8 |
| 18 | 0.0676 | 12.7 | 2.54E8 |
| 21 | 0.0799 | 12.4 | 1.91E8 |
| 24 | 0.0898 | 12.3 | 1.20E8 |
| 27 | 0.0998 | 12.8 | 1.30E8 |

Native Ubiquitin with Ion/Ion Reactions

Ion/ion reactions were applied to native ubiquitin ions in order to assess the three-dimensional structure and relative reactivity of residue side chains in the gas phase. Singly deprotonated sulfo-benzoyl-HOAT was used due to its lower barrier for covalent reaction in the gas phase relative to NHS esters (18 kcal/mol vs. 21 kcal/mol, respectively), with the ability to react with lysine, arginine, histidine, aspartate, and glutamate. FIG. 9A shows the ion/ion reaction of ubiquitin $6^+$ and sulfo-benzoyl-HOAT$^-$. Several parameters needed to be optimized for efficient covalent bond formation (neutral loss of HOAT from the ion/ion reaction product). Covalent product formation was not favorable at typical gas flows into the helium cell (>100 mL/min). CID in the helium cell was inefficient, and the major product observed was the proton transfer peak $[M+5H]^{5+}$, corresponding to loss of the electrostatically attached reagent. Virtually no covalent bond formation occurred, indicating that too much energy was being added to the system. Covalently-modified products may be formed by applying energy below the threshold for proton transfer product formation over an extended time. To use lower energies to effect CID and covalent product formation, the gas flows into the helium and IM cells were lowered to 20 mL/min (0.59 and 0.66 mbar pressures for each of the cells, respectively). This allowed the use of much lower collision energies, with the trapping region of the trap cell at 40 V, the transfer region of the trap cell at 30 V, and the entrance to the helium cell at 10 V relative to the helium cell. The lower collisional energies produced the covalently modified product while resulting in almost no proton transfer. The ATD in FIG. 9B was obtained under these voltage and pressure conditions. The peak at 12 ms corresponds to the unreacted precursor, the peak at ~15 ms corresponds to the addition of one sulfo-benzoyl-HOAT, and the peak at ~19 ms corresponds to the addition of two sulfo-benzoyl-HOAT groups. FIG. 9C shows the mass spectrum at 14.517-15.899 ms, showing covalent bond formation through neutral loss of HOAT. Due to the relatively short time of activation, the electrostatic complex peak was not completely depleted.

The ion/ion reaction results in the addition of up to two sulfo-benzoyl-HOAT reagents to the $6^+$ charge state. The reaction can proceed further by reducing the cation signal, changing the traveling wave and pressure in the trap cell, and increasing the anion signal. The trap cell conditions were chosen (300 m/s traveling wave, 0.2 V amplitude, 18 mL/min helium flow into the trap cell). Next, 45 V of transfer collision energy was applied to perform CID on the covalent reaction product in the transfer cell (1 mL/min argon flow rate, 0.01 mbar) to sequence the modified protein and determine the location of covalent modification.

The identities of the products matching the drift time of the covalently modified precursor were assigned to determine the sites of covalent modification. These were compared to CID of the mass isolated, unreacted $5^+$ charge state under similar conditions to ensure that all peaks assigned as covalently modified sequence fragments were only observed in the covalent modification spectrum (FIG. 9D). The results are shown in FIG. 10. The smallest unique y ion including the modification was $y_{24}$ (FIG. 9E). The nearest unmodified ion smaller than $y_{24}$ was the unmodified $y_{22}$ ion. Thus, the reaction took place with a side chain between the two cleavage sites. This localizes the modification site to two amino acid residues: glycine 53 and arginine 54. Therefore, one modification site may be arginine 54 since glycine is unreactive towards HOAT ester chemistry. The complementary ion to $y_{24}$, $b_{52}$, is also observed as a covalently modified sequence ion. This indicates that there may be another side chain with similar surface accessibility and reactivity. The smallest unique modified peptide was $b_{32}$, and the nearest unmodified neighbor smaller than $b_{32}$ is $b_{27}$. Thus, the modified residue may be between alanine 28 and aspartic acid 32. The observation of the intact covalent modification mass addition in this section of the sequence may be explained by covalent modification of lysine 29.

The sites for covalent modification must be accessible to the reagent and reactive. This precludes buried side chains in the interior of the protein as well as protonated side chains. Recently, 193 nm ultraviolet photodissociation (UVPD) was used to probe the protonation locations of different native charge states of ubiquitin in the gas phase, as UVPD results in fragmentation before protons can mobilize or the protein begins to unfold. The results from the $6^+$ charge state of ubiquitin are consistent with the ion/ion reaction results and whether the side chains are exposed or buried in the crystal structure (PDB 1UBQ). Neither arginine 54 nor lysine 29 are protonated in the gas phase, and the crystal structure shows that these side chains are on the exterior of the protein, so they are likely candidates for modification. The only other residue that clearly meets these requirements is lysine 6. Previously, calculated estimates based upon intrinsic gas-phase basicities of the amino acid residues have shown that this lysine has a high gas-phase basicity, which indicates that if this residue is unprotonated, it is likely quite reactive toward electrophiles such as the HOAT ester.

Ion Mobility Measurements for Assessing the Structure of Ubiquitin $6^+$ in the Trap Cell Conclusions regarding the applicability of gas-phase protein structural information to solution-phase structures could be meaningful if the gas-phase structure maintains the solution-phase intramolecular and intermolecular interactions. Molecular dynamics simulations using ensembles of solution phase structures for proteins have predicted accurate ion mobility spectra. This method predicts that for a ubiquitin cation with a measured nitrogen CCS reflecting the nitrogen CCS calculated from the X-ray structure of ubiquitin (1209 Å$^2$), solution interactions are maintained. The nitrogen CCS of ubiquitin $6^+$ cations were measured under ion/ion reaction conditions but without the introduction of anion to determine the overall structure of the protein in the trap cell. CCS values were measured by calibration with nitrogen literature CCS values and are expected to have a relative error of <5%.

IM instruments can cause collisional activation and rearrangement of small proteins like ubiquitin when applying activation energy to drive ions into the mobility cell. FIGS. 11A-C show the effects of increasing injection energy into the mobility cell. FIG. 11A is the ATD of ubiquitin $6^+$ with 30 V of injection energy into the helium cell. The base peak has a measured CCS of 1230 Å$^2$, with a small peak beginning to form at a CCS of 1410 Å$^2$ that is attributed to collisional activation entering the helium cell. Values below 30 V gave no observable signal. No parameters within the chosen range of values of lenses before the trap affected the ATD's appearance, giving evidence that even under the gentlest usable conditions there is some heating when ions are injected into the helium cell, and that the ubiquitin in the trap sampled by ion/ion reactions maintains a native-like structure. Increasing the injection energy to 40 V (FIG. 11B) yields a more unfolded distribution, with peaks at 1545, 1790, and 1930 Å$^2$. FIG. 11A shows that with 50 V of injection energy, the distribution is completely extended. The ATD is not necessarily indicative of the population in the trap, as in these experiments, only the injection energy into the helium cell (i.e., after ion/ion reactions have taken place) has a major effect on the observed ATD.

Therefore, though the collisional energy applied after the trap may cause small proteins to unfold, the reaction may be more indicative of more native-like gas-phase structure. The strong electrostatic binding from the sulfonate group on the reagent to a protonated side chain may anchor the reagent in place when the collision energy to overcome the barrier to covalent reaction is applied. The total through space length of the reagent from the location of covalent bond formation to the sulfonate group is less than 7 Å, which constrains the reaction to nearby amino acid residues. Thus, the side chains that covalently react with the reagent may be within ~10 Å from the anchor site regardless of whether the covalent reaction takes place with native-like or unfolded structures. The reaction may be indicative of a limited region on the protein that is reactive to the chemistry. This portion of the polypeptide is accessible and contains a nucleophilic side chain and charged group with their distance from each other constrained by the size of the reagent. Ubiquitin is a small model protein, and larger proteins and protein complexes, with many more vibrational degrees of freedom and intramolecular and intermolecular interactions, may be less sensitive to collisional unfolding under these conditions, making the energies required for formation of the covalent bond less likely to unfold structures. Therefore, ion/ion reactions may be effective probe of the structures of larger proteins and protein complexes.

Example 13

Tryptic peptides from bovine serum albumin (BSA) were reacted with sulfobenzoyl-HOAT anions. Ions from m/z 640 to 660 were mass selected, including the doubly charged versions of the BSA peptides HPEYAVSVLLR (SEQ ID NO: 3), EC(Carbamidomethyl)C(Carbamidomethyl)DKPLLEK (SEQ ID NO: 7), and HLVDEPQNLIK (SEQ ID NO: 5). FIG. 12A shows the extracted ion drift time spectra of these peptides. The IM system cannot separate the three doubly charged peptides. The products of the ion/ion reaction with the peptides were proton transfer (FIG. 12B) and complex formation (FIG. 12C).

The invention claimed is:

1. A mass spectrometry method, comprising:
   generating ions to form a mixture of ions comprising a first ion and a second ion, the first and second ions having overlapping mobilities,
   contacting, in a trap cell, the first ion and the second ion with a mobility modifier to form reaction products including a modified first ion and a modified or unmodified second ion, wherein the mobilities of the first modified ion and the modified or unmodified second ion are distinct from one another,
   separating in an ion mobility cell the modified first ion and the modified or unmodified second ion formed in the trap cell, and
   analyzing a mass spectrum of ions from the ion mobility cell.

2. The method of claim 1, wherein the step of contacting occurs in the gas phase.

3. The method of claim 1, wherein the mixture of ions comprises proteins, peptides, lipids, carbohydrates, small molecules, or a combination thereof.

4. The method of claim 1, wherein the mixture of ions comprises cations or anions.

5. The method of claim 1, wherein the step of generating is performed by an electrospray source.

6. The method of claim 1, wherein the step of analyzing is performed by a time-of-flight mass analyzer.

7. The method of claim 1, wherein the mobility modifier comprises at least one, at least two, or at least three ionizable groups.

8. The method of claim 1, wherein the mobility modifier comprises a cross-linking group.

9. The method of claim 8, wherein the cross-linking group is an aldehyde, an anhydride, a thiol, a maleimide, an activated ester, a ketenimide, an isoxazolium, an acyl halogen, an azide, a carbene, or a hydrazide.

10. The method of claim 1, wherein the mobility modifier is ionic.

11. The method of claim 10, wherein the mobility modifier is cationic.

12. The method of claim 11, wherein the mobility modifier comprises a quaternary ammonium salt, an amine, a guanidinium, or a metal ion.

13. The method of claim 10, wherein the mobility modifier is anionic.

14. The method claim 13, wherein the mobility modifier comprises a sulfonate, a phosphonate, a carboxylate, or a combination thereof.

15. The method claim 1, wherein the mobility modifier comprises an aryl sulfonate.

16. The method of claim 1, wherein the mobility modifier comprises an organic dye.

17. The method of claim 1, wherein the step of contacting forms ionic complexes.

18. The method of claim 1, wherein the mobility modifier forms a covalent bond with an ion in the mixture of ions.

19. The method of claim 1, wherein
contacting the second ion with the mobility modifier does not form the modified second ion,
such that the modified first ion and the unmodified second ion are passed from the trap cell to the ion mobility cell.

20. The method of claim 1, wherein contacting the second ion with the mobility modifier forms the modified second ion, such that the modified first ion and the modified second ion are passed from the trap cell to the ion mobility cell.

* * * * *